US00RE45502E

(19) United States
(12) Reissued Patent
Sakane et al.

(10) Patent Number: US RE45,502 E
(45) Date of Reissued Patent: May 5, 2015

(54) PHOSPHOR AND MANUFACTURING METHOD THEREFORE, AND LIGHT SOURCE USING THE PHOSPHOR

(75) Inventors: Kenji Sakane, Tokyo (JP); Akira Nagatomi, Tokyo (JP)

(73) Assignees: Dowa Electronics Materials Co., Ltd., Tokyo (JP); Nichia Corporation, Anan-shi (JP)

(21) Appl. No.: 13/414,703

(22) Filed: Mar. 7, 2012

Related U.S. Patent Documents

Reissue of:
(64) Patent No.: 7,476,335
Issued: Jan. 13, 2009
Appl. No.: 11/063,847
Filed: Feb. 23, 2005

(30) Foreign Application Priority Data

Aug. 20, 2004 (JP) ..... 2004-241308

(51) Int. Cl.
*C09K 11/56* (2006.01)
*C09K 11/64* (2006.01)
(Continued)

(52) U.S. Cl.
CPC ..... *C09K 11/7709* (2013.01)

(58) Field of Classification Search
USPC ..... 252/301.4 F; 257/98; 313/503
See application file for complete search history.

(56) References Cited

U.S. PATENT DOCUMENTS

| | | | | |
|---|---|---|---|---|
| 18,985 | A | 12/1857 | Olds | 241/259 |
| 2,121,275 | A | 6/1938 | Zober et al. | 241/206 |
| 3,527,595 | A | 9/1970 | Adler et al. | 148/426 |

(Continued)

FOREIGN PATENT DOCUMENTS

| | | | |
|---|---|---|---|
| EP | 0 459 156 A2 | | 4/1991 |
| EP | 459156 | * | 4/1991 |

(Continued)

OTHER PUBLICATIONS

Ex Parte Quayle in U.S. Appl. No. 13/414,704 dated Nov. 18, 2013.
(Continued)

*Primary Examiner* — Carol M Koslow
(74) *Attorney, Agent, or Firm* — Foley & Lardner LLP

(57) ABSTRACT

To provide a phosphor having a broad emission spectrum with a peak in the range from yellow color to red color (wavelength from 570 nm to 620 nm), having a flat excitation band with large area on the long wavelength side from near ultraviolet/ultraviolet to green color (wavelength from 250 nm to 550 nm), and excellent in emission intensity and luminance, and a method of manufacturing the same, and also a light source such as white LED using the phosphor. As raw materials, $Ca_3N_2$(2N), AlN(3N), $Si_3N_4$(3N), and $Eu_2O_3$(3N) are prepared, and out of each raw material, 0.950/3 mol of $Ca_3N_2$, 2 mol of AlN, 4/3 mol of $Si_3N_4$, and 0.050/2 mol of $Eu_2O_3$ are weighed, and the raw materials thus weighed are mixed by using a mortar. The raw materials thus mixed are put in a BN crucible, and retained/fired for 3 hours at 1700° C. in a nitrogen atmosphere, and thereafter cooled from 1700° C. to 200° C., to thereby obtain the phosphor expressed by a composition formula $$Ca_{0.950}Al_2Si_4O_{0.075}N_{7.917}:Eu_{0.050}.$$

19 Claims, 8 Drawing Sheets

(51) Int. Cl.
*C09K 11/55* (2006.01)
*C09K 11/77* (2006.01)

(56) References Cited

U.S. PATENT DOCUMENTS

| | | | | |
|---|---|---|---|---|
| 3,697,301 | A | 10/1972 | Donofrio et al. | 428/334 |
| 4,477,689 | A | 10/1984 | Ogasahara et al. | 174/15.4 |
| 4,576,736 | A | 3/1986 | Harmuth | 252/512 |
| 5,398,398 | A | 3/1995 | Williams et al. | 29/599 |
| 5,447,291 | A | 9/1995 | Sandhage | 148/516 |
| 5,600,202 | A | 2/1997 | Yamada et al. | 313/467 |
| 6,180,029 | B1 | 1/2001 | Hampden-Smith et al. | 252/301.4 R |
| 6,504,297 | B1 | 1/2003 | Heo et al. | 313/467 |
| 6,642,652 | B2 | 11/2003 | Collins et al. | |
| 6,670,748 | B2 | 12/2003 | Ellens et al. | 313/503 |
| 7,138,756 | B2 * | 11/2006 | Gotoh et al. | 313/467 |
| 7,252,788 | B2 | 8/2007 | Nagatomi et al. | |
| 7,345,418 | B2 | 3/2008 | Nagatomi et al. | |
| 7,432,647 | B2 | 10/2008 | Nagatomi et al. | |
| 7,443,094 | B2 * | 10/2008 | Sakane et al. | 313/503 |
| 7,445,730 | B2 * | 11/2008 | Nagatomi et al. | 252/301.4 F |
| 7,476,336 | B2 * | 1/2009 | Nagatomi et al. | 252/301.4 F |
| 7,477,009 | B2 | 1/2009 | Nagatomi et al. | |
| 7,514,860 | B2 * | 4/2009 | Nagatomi et al. | 313/503 |
| 8,048,338 | B2 * | 11/2011 | Nagatomi et al. | 252/301.4 F |
| 2002/0043926 | A1 | 4/2002 | Takahashi et al. | 313/503 |
| 2003/0020028 | A1 * | 1/2003 | Iihama et al. | 250/556 |
| 2003/0030038 | A1 | 2/2003 | Mitomo et al. | |
| 2003/0030368 | A1 | 2/2003 | Ellens et al. | 313/503 |
| 2003/0094893 | A1 * | 5/2003 | Ellens et al. | 313/503 |
| 2003/0132422 | A1 | 7/2003 | Tian et al. | 252/301.4 S |
| 2003/0152804 | A1 | 8/2003 | Miura et al. | 428/690 |
| 2003/0213611 | A1 | 11/2003 | Morita | 174/126.2 |
| 2004/0155225 | A1 | 8/2004 | Yamada et al. | 252/301.4 R |
| 2004/0263074 | A1 | 12/2004 | Baroky et al. | 313/512 |
| 2005/0001225 | A1 | 1/2005 | Yoshimura et al. | 257/98 |
| 2005/0189863 | A1 * | 9/2005 | Nagatomi et al. | 313/486 |
| 2005/0203845 | A1 | 9/2005 | Yoshimine et al. | 705/40 |
| 2005/0205845 | A1 | 9/2005 | Delsing et al. | 252/301.4 R |
| 2005/0253500 | A1 | 11/2005 | Gotoh et al. | 313/486 |
| 2005/0267243 | A1 | 12/2005 | Amasaki et al. | 524/439 |
| 2006/0006782 | A1 * | 1/2006 | Nagatomi et al. | 313/486 |
| 2006/0017365 | A1 * | 1/2006 | Nagatomi et al. | 313/485 |
| 2006/0021788 | A1 | 2/2006 | Kohayashi et al. | 174/125.1 |
| 2006/0022573 | A1 | 2/2006 | Gotoh et al. | 313/467 |
| 2006/0033083 | A1 | 2/2006 | Sakane et al. | 252/301.4 F |
| 2006/0043337 | A1 | 3/2006 | Sakane et al. | 252/301.4 F |
| 2006/0045832 | A1 * | 3/2006 | Nagatomi et al. | 423/325 |
| 2006/0065878 | A1 | 3/2006 | Sakane et al. | 252/301.4 F |
| 2006/0076883 | A1 | 4/2006 | Himaki et al. | 313/503 |
| 2006/0091790 | A1 * | 5/2006 | Nagatomi et al. | 313/503 |
| 2006/0170332 | A1 | 8/2006 | Tamaki et al. | 313/498 |
| 2006/0197432 | A1 | 9/2006 | Nagatomi et al. | 313/487 |
| 2006/0197439 | A1 | 9/2006 | Sakane et al. | 313/503 |
| 2006/0220047 | A1 | 10/2006 | Nagatomi et al. | 257/98 |
| 2006/0220520 | A1 | 10/2006 | Sakane et al. | 313/487 |
| 2006/0244356 | A1 | 11/2006 | Nagatomi et al. | 313/485 |
| 2007/0007494 | A1 | 1/2007 | Hirosaki et al. | 252/301.4 R |
| 2007/0029525 | A1 | 2/2007 | Gotoh et al. | 252/301.4 F |
| 2007/0164308 | A1 | 7/2007 | Yoshimura et al. | 257/103 |

FOREIGN PATENT DOCUMENTS

| | | | |
|---|---|---|---|
| EP | 1 296 376 | A2 | 3/2003 |
| EP | 1296376 | * | 3/2003 |
| EP | 1 445 292 | A1 | 8/2004 |
| EP | 1445295 | * | 8/2004 |
| EP | 1 696 016 | A1 | 8/2006 |
| JP | 05-015655 | | 1/1993 |
| JP | 05-15655 | * | 1/1993 |
| JP | 05-198433 | | 8/1993 |
| JP | 11-277527 | | 10/1998 |
| JP | 11-144938 | | 5/1999 |
| JP | 11-277527 | * | 10/1999 |
| JP | 2000-73052 | * | 3/2000 |
| JP | 2000-073053 | | 3/2000 |
| JP | 2000-153167 | | 6/2000 |
| JP | 2001-214162 | * | 8/2001 |
| JP | A 2001-214162 | | 8/2001 |
| JP | 2002-363554 | * | 12/2002 |
| JP | A 2002-363554 | | 12/2002 |
| JP | 2003-13059 | * | 1/2003 |
| JP | 2003-013059 | | 1/2003 |
| JP | 2003-096446 | | 4/2003 |
| JP | 2003-96446 | * | 4/2003 |
| JP | 2003-124527 | * | 4/2003 |
| JP | A 2003-124527 | | 4/2003 |
| JP | 2003-515655 | * | 5/2003 |
| JP | A 2003-515655 | | 5/2003 |
| JP | 2003-277746 | * | 10/2003 |
| JP | A 2003-277746 | | 10/2003 |
| JP | 2003-336059 | * | 11/2003 |
| JP | A 2003-336059 | | 11/2003 |
| JP | 2004-055910 | | 2/2004 |
| JP | 2004-55910 | * | 2/2004 |
| JP | 2004-505470 | | 2/2004 |
| JP | 2004-67837 | * | 3/2004 |
| JP | A 2004-67837 | | 3/2004 |
| JP | 2004-145718 | | 5/2004 |
| JP | 2004-166058 | | 6/2004 |
| JP | 2004-186278 | * | 7/2004 |
| JP | 2004-189997 | | 7/2004 |
| JP | 2004-207271 | | 7/2004 |
| JP | A-2004-186278 | | 7/2004 |
| JP | 2004-235598 | | 8/2004 |
| JP | 2004-244560 | | 9/2004 |
| JP | 2004-55536 | * | 12/2004 |
| JP | 2004-055536 | | 12/2004 |
| JP | 2005-344025 | | 12/2005 |
| JP | 2006-028295 | | 2/2006 |
| JP | 2006-28295 | * | 2/2006 |
| JP | 2006-63214 | * | 3/2006 |
| JP | 2006-063214 | | 3/2006 |
| JP | 2006-63286 | * | 3/2006 |
| JP | 2006-063286 | | 3/2006 |
| JP | 2006-70109 | * | 3/2006 |
| JP | 2006-070109 | | 3/2006 |
| JP | 2006-176546 | | 7/2006 |
| JP | 2006-282809 | | 10/2006 |
| JP | 2006-282872 | | 10/2006 |
| WO | WO 01/40403 | * | 6/2001 |
| WO | WO 01/40403 | A1 | 6/2001 |
| WO | WO 02/11214 | * | 2/2002 |
| WO | WO 02/11214 | A1 | 2/2002 |
| WO | WO 2004/030109 | * | 4/2004 |
| WO | WO 2004/030109 | A1 | 4/2004 |
| WO | WO 2004/039915 | * | 5/2004 |
| WO | WO 2004/039915 | A1 | 5/2004 |
| WO | WO 2004/055910 | * | 7/2004 |
| WO | WO 2004/055910 | A1 | 7/2004 |
| WO | WO 2005/052087 | * | 6/2005 |
| WO | WO 2005/052087 | A1 | 6/2005 |
| WO | WO-2006/093298 | A1 | 9/2006 |

OTHER PUBLICATIONS

Final Office Action received in U.S. Appl. No. 13/100,751 dated May 30, 2012.

Non-Final Office Action in U.S. Appl. No. 13/414,704 dated Mar. 13, 2013.

Notice of Allowance in U.S. Appl. No. 13/414,704 dated Mar. 21, 2014.

Office Action in U.S. Appl. No. 13/417,146 dated Feb. 6, 2014.

US Notice of Allowance received in U.S. Appl. No. 13/100,751 dated Dec. 21, 2012.

US Office Action received in U.S. Appl. No. 13/100,751 dated Jan. 27, 2012.

JIS Z 8726, "Method of Specifying Colour Rendering Properties of Light Sources"; (1990), pp. 381-390.

"Phosphor Handbook"; (compiled by Phosphor Research Society, published by Ohmusha, Ltd., 1987); pp. 172-176.

U.S. Appl. No. 11/194,590, filed Aug. 2, 2005.

(56) References Cited

OTHER PUBLICATIONS

K Uheda et al, "The Crystal Structure and Photoluminescence Properties of a New Red Phosphor, Calcium Aluminum Silicon Nitride Doped With Divalent Europium," Abs. 2073, 206th Meeting, Oct. 3, 2004.

* cited by examiner

PHOSPHOR AND MANUFACTURING METHOD THEREFORE, AND LIGHT SOURCE USING THE PHOSPHOR

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

TECHNICAL FIELD OF THE INVENTION

The present invention relates to a phosphor used for a display such as a cathode-ray tube (CRT), a field emission display (FED), and a plasma display (PDP), and an illumination device such as a fluorescent lamp and a fluorescent display tube, and a light source for crystal liquid back lights and a method of manufacturing therefore, and also to the light source including a white LED using the phosphor.

BACKGROUND OF THE INVENTION

Conventionally, a discharge type fluorescent lamp and an incandescent bulb used as the illumination device involve problems that a harmful substance such as mercury is contained, life span is short, and heat generation is violent. Here, as the illumination device capable of solving such problems, for example, a white LED illumination is proposed. In recent years, a high luminescence LED emitting light of blue color and nearly ultraviolet/ultraviolet has been developed in sequence, and the white LED illumination for the practical application has been actively studied and developed. When the white LED illumination is put to practical use, since less heat is generated and it is constituted of a semiconductor device and a phosphor, the white LED has advantages of good life span without burn-out of a filament like a conventional incandescent bulb and the harmful substance such as mercury to not necessary, thereby realizing an ideal illumination device.

At present, two systems of the white LED illumination are proposed. As one of them, a multi chip type system is given, in which three primary color LED such as red LED (R) with high luminance, blue LED with high luminance (B), and green LED (G) with high luminance are used. As the other of them, one chip system, which have been developed in recent years, is given, in which LED such as ultraviolet LED with high luminance and blue LED with high luminance, and the phosphor excited by the light having an emission spectrum with a peak in the range from ultraviolet to blue color generated by the LED are combined.

The multi chip type includes the module type in which three kind LEDs of R, G, B are mounted on a substrate, and the 3in 1 chip type in which the three kind light emitting elements of R, G, B are formed into an one chip. From the viewpoint of brightness and luminance, the module type is superior to the 3in 1 chip type. However, the module type has problems that the light guide for mixing the light of R, G, B is complicated, and the manufacturing cost is high. Meanwhile, the 3in 1 chip LED type has problems that since the three kind LEDs of R, G, B are formed into an one chip, the size of a package is increased and each light emitting element has different drive voltage and optical output, thereby having different temperature characteristics and life span accordingly. Further, both of the module type and the 3in 1 chip type LED have a sharp emission spectrum, and therefore the emission spectrum of the white light is far from the spectrum of the sun light, and color rendering properties are inferior. However, as described above, by utilizing the advantage that the brightness and the luminance are excellent and an arbitrary light can be obtained by controlling the optical output of the LEDs of R, G, B, these multi chip type are used as the light source of the backlight for liquid crystal and a large full-color LED display.

Meanwhile, the one chip type system has a preferable characteristic as the light source for illumination, such that since it is constituted by combining an LED and the phosphor, it can be small-sized, and the light guide for mixing the emission is simplified, and in addition, the drive voltage, the optical output, and the temperature characteristics of each LED are not required to be taken into consideration, thus realizing cost reduction. Further, by using the phosphor having a broad emission spectrum, the white emission spectrum is approximated the spectrum of the sun-light, and the color rendering properties are possibly improved. This contributes to focusing on the one chip type system as the illumination of next generation, compared with the multi chip type system.

Further two systems are considered for the one chip-type white LED in which the high luminance LED and the phosphor are combined. In one of them, the blue LED with high luminance and the phosphor emitting yellow color by being excited by blue light generated from the LED are combined, and white color is obtained by using a complementary relation between the blue emission of the LED and yellow emission of the phosphor. In the other of them, the LED emitting near ultraviolet/ultraviolet light, the phosphor emitting red (R) color, the phosphor emitting green (G) color, and the phosphor emitting blue (B) color by being excited by the near ultraviolet/ultraviolet light generated from the LED are combined, and the white light is obtained by mixing the colors of the lights obtained from the phosphors of R, G, B and so forth.

As the white LED combining the blue LED with high luminance and the phosphor emitting yellow color excited by the blue light generated from the LED, the white LED combining the blue LED with high luminance and a yellow phosphor $(Y, Gd)_3(Al, Ga)_5O_{12}$:Ce is proposed. Such a white LED has an advantage that kind of the phosphor to be used may be reduced by using the complementary relation between the blue light and the yellow light. Further, $(Y, Gd)_3(Al, Ga)_5O_{12}$:Ce has an excitation spectrum with a peak near the wavelength of 450 nm, thereby emitting light with high efficiency, and the white LED of high luminance can thereby be obtained.

However, in the white LED illumination by combining the blue LED with high luminance and the yellow phosphor $(Y, Gd)_3(Al, Ga)_5O_{12}$:Ce, the emission on the long-wavelength side of visible light range is insufficient. Therefore, only slightly bluish white emission can be obtained, and a slightly reddish white emission like an electric bulb can not be obtained. Further, the problem is that the red light having an emission spectrum in the wavelength range from 600 nm to 650 nm is insufficient, thereby deteriorating in the color rendering properties.

In the latter one chip-type white LED, white color is obtained by mixing the colors of the emission obtained from the phosphors such as R, G, B and so forth, by combining the LED emitting the near ultraviolet/ultraviolet light, the each phosphor emitting red (R), green (G), blue (B) colors excited by the near ultraviolet/ultraviolet light generated from the LED. A method of obtaining the white emission by mixing the emission such as the R, G, B is characterized in that an arbitrary emission color other than the white light can be obtained by controlling a combination and a mixing ratio of the R, G, B and also the white emission with excellent color rendering properties is obtained by the relation in a mixed state of colors not using the complementary relation but using the R, G, B. Then, as the phosphor used for such an application, examples are given such as $Y_2O_2S$:Eu, $La_2O_2S$:Eu, 3.5MgO.0.5$MgF_2$.$GeO_2$:Mn, (La, Mn, Sm)$_2O_2S$.$Ga_2O_3$:Eu for the red phosphor, ZnS:Cu,Al, $SrAl_2O_4$:Eu, BAM:Eu,Mn, $Ba_2SiO_4$:Eu for the green phosphor, and BAM:Eu, $Sr_5(PO_4)_3Cl$:Eu, ZnS:Ag, (Sr, Ca, Ba, Mg)$_{10}(PO_4)_6Cl_2$:Eu for the blue phosphor.

In the white LED illumination formed by combining the near ultraviolet/ultraviolet LED and the R, G, B and so forth, an excitation efficiency and an emission efficiency of the red phosphor out of the phosphors of the R, G, B and so forth is lower compared with the phosphor of other colors in an excitation range of the near ultraviolet/ultraviolet region. Therefore, the combination of the R, G, B and so forth has no other choice but increase the mixing ratio of only the red phosphor. This causes an insufficient mixing ratio of the phosphor such as the green phosphor improving the luminance, and the white color with high luminance can not be obtained. Further, the red phosphor according to the conventional technique has a sharp emission spectrum, thereby involving the problem that the color rendering properties of the white light obtained is unsatisfactory.

In order to solve the aforementioned problem that the red light near the wavelength range from 600 nm to 650 nm is insufficient in the white LED illumination by combining the blue LED and the yellow phosphor, and the problem involved in the red phosphor in the white LED illumination by combining the near ultraviolet/ultraviolet LED and the R, B, G and so forth, the phosphors are proposed, such as an oxynitride glass phosphor (for example, see patent document 1) having a flat excitation band with a large area up to the range of the long wavelength side, and capable of obtaining a broad emission peak in the range from yellow color to the red color, sialon-based phosphor (for example, see patent documents 2, 3, 4, 5), a silicon nitride-based phosphor (for example, see patent documents 6 and 7). The phosphor containing nitrogen as described above has a larger ratio of convalent bonds, compared with the oxide-based phosphor, and therefore has a good excitation band even in the light having an emission spectrum with a peak at 400 nm or more.

(Patent document 1) Japanese Patent Laid Open No.2001-214162

(Patent document 2) Japanese Patent Laid Open No.2002-363554

(Patent document 3) Japanese Patent Laid Open No.2003-336059

(Patent document 4) Japanese Patent Laid Open No.2003-124527

(Patent document 5) Japanese Patent Laid Open No.2004-67837

(Patent document 6) PCT Japanese Publication No.2003-515655

(Patent document 7) Japanese Patent Laid Open No.2003-277746

However, according to the study of the inventors, et al. of the present invention, even when combining not only the conventional red phosphor, but also the phosphors containing nitrogen such as the oxynitride glass phosphor, the sialon-based phosphor, and the silicon nitride-based phosphor, and the phosphor obtained by mixing other color phosphors, and the near ultraviolet/ultraviolet LED and the blue LED and so forth, the luminance of the white light obtained thereby is unsatisfactory. Here, as a result of the study on the luminance of the white light by the inventors, et, al. of the present invention, it is found that even the aforementioned phosphors containing nitrogen do not maintain a level to satisfy the emission efficiency in the excitation light of near ultraviolet/ultraviolet and blue color, and an emission intensity and the luminance are insufficient. It is considered that such insufficient emission intensity and luminance cause the luminance of the one chip-type white LED to be insufficient, when it is produced by combining the near ultraviolet/ultraviolet LED and blue LED and so forth and the aforementioned phosphors containing nitrogen, resulting in insufficient luminance, and unsatisfactory color rendering properties due to insufficient emission spectrum from orange color to red color near the wavelength range from 600 nm to 650 nm.

SUMMARY OF THE INVENTION

In view of the above-described problems, the present invention is provided, and an object of the present invention is to provide a phosphor having a broad emission spectrum in a range from yellow color to red color (in the wavelength range from 570 nm to 620 nm), having a flat excitation band with a large area on the long wavelength side from near ultraviolet/ultraviolet to green color (from 250 nm to 550 nm), and having an excellent emission efficiency and luminance, a method of manufacturing therefore, and a light source such as white LED using the phosphor.

The inventors of the present invention study on various kinds of phosphor composition in order to solve the above-described problems, with the result that a new phosphor having high emission intensity and high luminance with high efficiency and easy manufacture, by adjusting the phosphors having a matrix composition including a plurality of sites that can be substituted by an activator.

In order to solve the aforementioned problems, the present invention takes several aspects as follows.

In a first aspect, a phosphor is provided, which is given as a general composition formula expressed by MmAaBbOoNn:Z, (where element M is the element having bivalent valency, element A is the element having tervalent valency, element B is the element having tetravalent valency, O is oxygen, N is nitrogen, and element Z is the element acting as the activator.), expressed by $m=1$, $a+b<8$, $o\leq1.0$, $n=2/3m+a+4/3b-2/3o$.

In a second aspect, the phosphor according to the first aspect is provided, which is given as the composition formula expressed by $1.8\leq a/m\leq5.0$, $3.0\leq b/m\leq6.2$.

In a third aspect, the phosphor according to either of the first or second aspect is provided, which is given as the composition formula expressed by $a=2$, $4.0\leq b/m\leq5.5$.

In a fourth aspect, the phosphor to provided according to the third aspect, which is given as the composition formula expressed by $b/m=4.0$.

In a fifth aspect, the phosphor according to any one of the first to fourth aspects is provided, wherein the element M is one or more kind of element selected from a group consisting of Mg, Ca, Sr, Ba, Zn, and rare earth elements having bivalent valency, element A is one or more kind of element selected from a group consisting of B (boron), Al, Ga, In, Ti, Y, SC, P, As, Sb, and Bi, element B is one or more kind of element selected from the group consisting of C, Si, Go, Sn, Ti, Hf, Mo, W, Cr, Pb, Zr, and element Z is one or more kind of element selected from the group consisting of the rare earth elements and transition metal elements.

In a sixth aspect, the phosphor according to any one of the first to fifth aspects is provided, wherein the element A is Al and the element B is Si.

In a seventh aspect, the phosphor according to any one of the first to sixth aspects is provided, wherein the element M is one or more kind of element selected from the group consisting of Mg, Ca, Sr, Ba, and Zn.

In a eighth aspect, the phosphor according to any one of the first to seventh aspects is provided, wherein the element Z is one or more kind of element selected from the group consisting of Eu, Mn, Ce, and Tb.

In a ninth aspect, the phosphor according to any one of the first to eighth aspects is provided, wherein the element Z is Eu.

In a tenth aspect, the phosphor according to any one of the first to ninth aspects is provided, wherein the element M is Ca, the element A is Al, and the element B is Si.

In an eleventh aspect, the phosphor according to any one of the first to tenth aspects is provided, wherein when the general formula is expressed by MmAaBbOoNn:Zz, the value of z/(m+z), which is a molar ratio of the element M to the element Z, is not less than 0.0001 and not more than 0.5.

In a twelfth aspect, a phosphor is provided, containing Ca of 8.4 to 13.5 wt %, Al of 11.7 to 17.9wt %, Si of 29.8 to 41.7 wt %, O of 0 to 5.0 wt %, N of 30.5 to 37.0 wt %, and Eu of 0.01 to 5.0 wt %, wherein a peak wavelength in an emission spectrum is in a range from 570 to 620 nm, with chromaticity x of the light emission in the range from 0.5 to 0.6, and y in the range from 0.4 to 0.5.

In a thirteenth aspect, the phosphor according to any one of the first to twelfth aspects is provided, wherein the phosphor is formed in hexagonal crystals.

In a fourteenth aspect, the phosphor according to any one of the first to thirteenth aspects is provided, wherein the phosphor is a powdery form.

In a fifteenth aspect, the phosphor according to the fourteenth aspect is provided, wherein an average particle size of the phosphor is not less than 20 μm and not more than 1.0 μm.

In a sixteenth aspect, a method of manufacturing the phosphor according to any one of the first to fifteenth aspects is provided, wherein by using nitride of each element as a supply source of the element M, the element A, and the element B, the raw material is fired at 1000° C. or more in an atmosphere of inactive gas.

In a seventeenth aspect, a light source is provided, comprising the phosphor according to any one of the first to fifteenth aspects and a light emitting part for emitting light of a first wavelength, wherein by using a part or the whole part of the light of the first wavelength as an excitation light, the phosphor is caused to emit light with a wavelength different from the first wavelength.

In an eighteenth aspect, the light source according to the seventeenth aspect is provided, wherein the first wavelength is the wavelength from 250 nm to 550 nm.

In a nineteenth aspect, the light source according to either of the seventeenth aspect or the eighteenth aspect is provided, wherein the light emitting part for emitting the light of the first wavelength is an LED.

The phosphor according to the first to fifteenth aspects provides the phosphor having a broad emission spectrum in the range from yellow color to red color (in the wavelength range from 570 nm to 620 nm), having a flat excitation band with large area on the long wavelength side from the near ultraviolet/ultraviolet color to green color (in the wavelength range from 250 nm to 550 mm), having high emission intensity and luminance, and emitting light with high efficiency.

According to the sixteenth aspect, the phosphor according to any one of the first to fifteenth aspects can be manufactured at a low manufacturing cost.

According to the seventeenth or eighteenth aspect, the light source having a desired emission color excellent in color rendering properties, and having high emission intensity and luminance with high efficiency can be obtained.

According to the nineteenth aspect, an LED having a desired emission color excellent in color rendering properties, and having the high emission intensity and luminance with high efficiency can be obtained.

DESCRIPTION OF THE PREFERRED EMBODIMENTS

Figure 1:
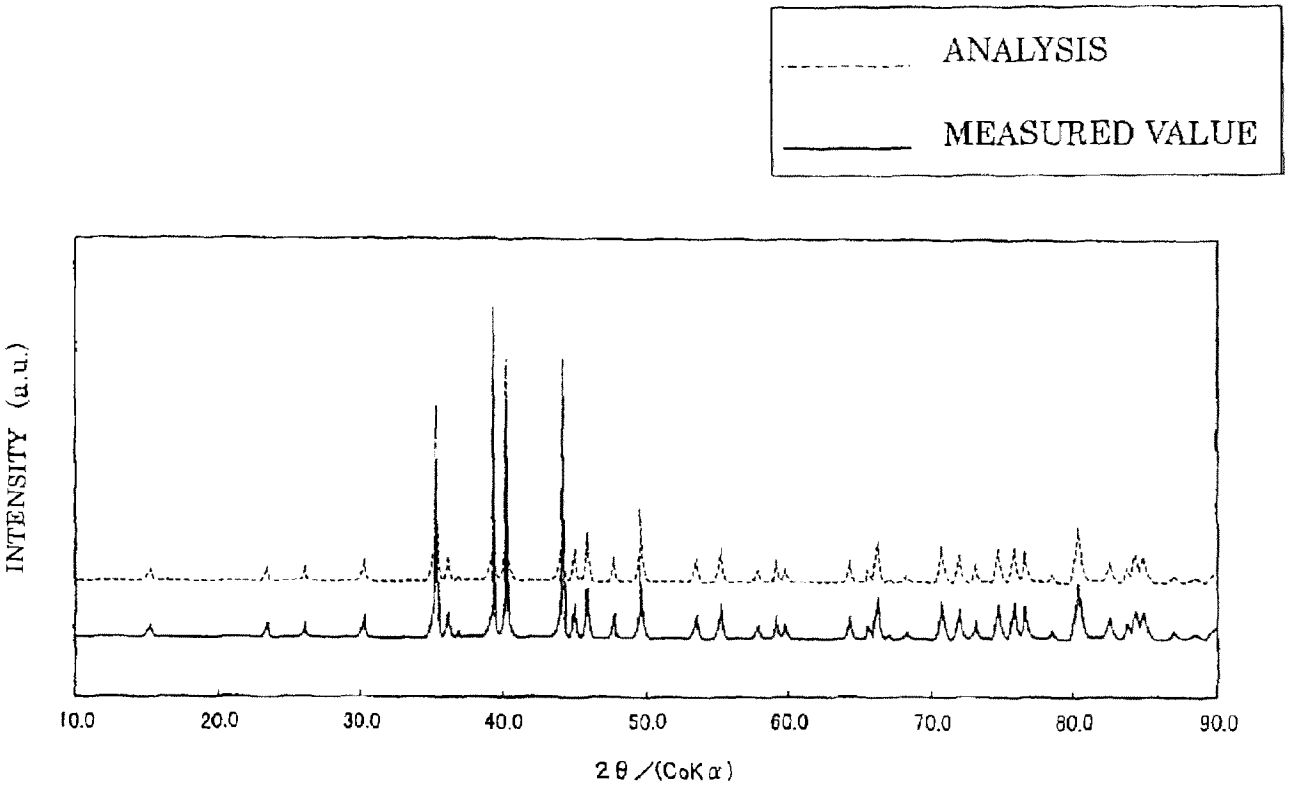
FIG. 1 is a graph showing a result of a Rietveld analysis.

A phosphor according to the present invention has a matrix composition given as a general formula expressed by MmAaBbOoNn:Z. Here, element M is one or more kind of element selected from the elements having bivalent valency in the phosphor. The element A is one or more kind of element having tervalent valency, element B is one or more kind of element having tetravalent valency, O is oxygen, N is nitrogen, and element Z is the element acting as the activator in the phosphor and at one or more kind of elements selected from rare earth elements or transition metal elements.

Further, in the phosphor, m is expressed by m=1, a+b is in a range satisfying a+b<8, oxygen is in the range satisfying o<1.0, and n is expressed by n=2/3+a+4/3b−2/3o, more preferably a/m is in the range satisfying 1.8≤a/m≤5.0, and b/m is in the range satisfying 3.0≤b/m≤6.2.

The phosphor having the aforementioned characteristics has a broad emission spectrum in the range from yellow color to red color (peak wavelength range from 570 nm to 620 nm), has a flat excitation band with large area on a long wavelength side from near ultraviolet/ultraviolet to green color (wavelength range from 250 nm to 550 nm), and capable of emitting light with high efficiency. Therefore, by mixing the aforementioned phosphors and the phosphor of other suitable color, and combining the phosphors thus mixed with a light emitting part such as a near ultraviolet/ultraviolet LED and a blue LED, the emission having a desired emission color excellent in color rendering properties and having a high emission intensity and luminance with high efficiency could be obtained.

Here, explanation will be given to the effects imparted by the phosphor of the present invention, when the phosphor according to the present invention has the flat excitation band with large area on the long wavelength side.

YAG:Ce, which is a general purpose yellow phosphor, is given as an example. The YAG;Ce is caused to emit light with the blue light emitted by the blue LED. In this case, since the YAG:Ce has the excitation band with high efficiency in an emission wavelength of the blue LED, a good yellow emission can be obtained. However, when the YAG:Ce is emitted with the near ultraviolet/ultraviolet light emitted by the near ultraviolet/ultraviolet LED, the YAG:Ce has the excitation band with low efficiency in the emission wavelength of the near ultraviolet/ultraviolet LED, failing in obtaining a sufficient emission. Further, due to a narrow bandwidth of the excitation band of the YAG:Ce, variation in the blue LED in manufacturing process causes the emission wavelength to be changed even when excited by the blue light of the blue LED. As a result, when the emission wavelength of the blue LED becomes outside the range of an optimal excitation band of the YAG:Ce, a wavelength balance between the blue color and the yellow color is lost in some cases. Such a condition involves a problem of changing a color tone of the white light obtained by synthesizing the blue light and the yellow light. Therefore, it is necessary to develop the phosphor having the flat excitation band with large area up to the long wavelength side, which is the range from near ultraviolet/ultraviolet to green color (wavelength range from 250 nm to 550 nm). The phosphor according to the present invention satisfies the above necessity.

Next, explanation will be given to the effects imparted by obtaining the emission with high efficiency in the range from yellow color to the red color (peak wavelength range from 570 nm to 620 nm).

The conventional yellow to red phosphors having an emission spectrum having a peak wavelength in the range from yellow color to red color (emission spectrum with a peak in the wavelength range from 570 nm to 620 nm) has low emission intensity and luminance, compared with the phosphor emitting blue light and green light. Therefore, when a specified emission color is obtained by mixing with a plurality of phosphors and combining with the near ultraviolet/ultraviolet LED, there is no other choice but a method for supplementing an emission quantity of yellow color to red color, by increasing the mixing ratio of the yellow color to red color compared with the phosphor of other color. However, when such a method of increasing the yellow color to red color is used, the mixing ratio of the green phosphor and the blue phosphor capable of obtaining luminance is reduced, resulting in a light source with insufficient luminance even though a target emission color is obtained. Under such circumstances, the phosphor according to the present invention has the emission spectrum having a peak wavelength from yellow color to red color (wavelength range from 570 nm to 620 nm), having the high emission intensity and luminance, and is capable of emitting light with high efficiency, thus solving the problem that the luminance is insufficient.

Finally, explanation will be given to a case of obtaining emission with high color rendering properties, by using the phosphor according to the present invention.

The color rendering properties means variation in the way of looks of the color of an object irradiated with light, depending on the kinds of the light source. Generally, the color rendering properties showing reproducibility of the color of an illuminated object can be expressed numerically by general color rendering index (Ra). If absolutely the same color as the color viewed with a reference light can be reproduced, the best color rendering index (Ra=100) is obtained, and the larger the difference in color is, the lower the Ra value is. (Ra<100)

Of course, preferably, the way of looks of the color is the same as in the case of using the reference light. However, the reference light has a white light source having uniform intensity of the light over the whole visible light region. Meanwhile, in the white LSD illumination, the existing white LED illumination lacks in uniformity in the intensity of the light. For example, the intensity of the light is high in a certain wavelength region of the visible light, and low in a certain wavelength region. Therefore, in the wavelength region where the intensity of the light is insufficient, color reproducing properties are deteriorated, and the color rendering properties are deteriorated.

For example, explanation will be given to the case in which the blue LED with high luminance, and the yellow phosphor YAGsCe, which is a general purpose phosphor, are combined to obtain the white light source.

The YAG:Ce is the phosphor having an emission spectrum with a peak at about 560 nm as described above, and having the emission spectrum having a best emission efficiency for visibility. In this condition, when the YAG:Ce and the blue LED with high luminance are combined to obtain the white light, the white light is sufficient in the viewpoint of the luminance (visibility). However, the emission color in region from 600 nm to 650 nm, which is the wavelength region from orange color to red color is insufficient. Therefore, when a red object is irradiated with the white light, the red color becomes dark as a phenomenon that occurs at this time. Namely, the color rendering properties of the white light is low.

Also, explanation will be given to the case in which by combining the near ultraviolet/ultraviolet LED and the R, G, B and so forth, for example, the white light source is obtained.

When $Y_2O_2S$: Eu and $La_2O_2S$: Eu are used as the red phosphor, the emission spectrum appears with a peak in the wavelength range from 600 nm to 650 nm, corresponding to the orange to red wavelength region. Therefore, the color rendering properties are improved, compared with the white light source by combining the YAG:Ce and the blue LED with high luminance. However, the $Y_2O_2S$:Eu and the $La_2O_2S$:Eu have a sharp emission spectrum, having a part where the intensity of the light is insufficient, and therefore satisfactory color rendering properties can not be obtained as is expected.

As a result, in order to obtain the emission with high color rendering properties, it was found that the phosphor having an emission spectrum with a peak in the range from yellow color to red color (wavelength range from 570 nm to 620 nm), having a broad emission spectrum, and having sufficient emission intensity was required. Also, it was found that the phosphor according to the present invention satisfied such a necessity.

A detailed reason is not clarified, why the phosphor according to the present invention has an emission spectrum with a peak in the range from yellow color to red color (wavelength range from 570 nm to 620 nm), having a broad emission spectrum, having a flat excitation band with large area on the long wavelength side, and is capable of emitting light with high efficiency. However, it is substantially considered as follows.

First, since the values of m, a, b, o, and n are in the above-described range, it is considered that the activator can be regularly present in a crystal structure of the phosphor, an excitation energy used for emission is transferred efficiently, and emission efficiency is thereby improved.

Next, it is considered that when the values of m, a, b, o, and n are in the aforementioned range, the phosphor becomes a chemically stable composition, and therefore impurity phase that does not contribute to the emission is hardly formed in the phosphor, and therefore the emission intensity is inhibited from deteriorating. Specifically, it is considered that when a plurality of impurity phases are formed, phosphor quantity per unit area irradiated with the excitation light is lowered, and the impurity phases absorb the excitation light and the emission, thereby lowering the emission efficiency of the phosphor to fail in obtaining high emission intensity.

The above-described estimate can be reinforced from the point that in X-ray diffraction measurement for the phosphor after fired, when the values of m, a, b, o, and n are in the aforementioned range, the peak of the impurity phase such as AlN, and $Si_3N_4$ can not be confirmed, or even if it is confirmed, it is a low diffraction intensity, while a remarkable peak of the impurity phase such as AlN, and $Si_3N_4$ can be confirmed when the aforementioned Values of m, a, b, o, and n are outside the range. Accordingly, it is considered that the characteristic that the peak of the impurity phase does not appear in an X-ray diffraction pattern for the phosphor after firing, shows that the phosphor to be measured has the high emission intensity and the flat excitation band with large area on the long wavelength side.

Although low content of oxygen is preferable in the phosphor according to the present invention, actually slight amount of oxygen is contained therein. It is considered that the oxygen thus slightly contained is the oxygen initially contained in a material, the oxygen mixed in by oxidization of the surface of the material when the material is measured, mixed, and fired, and further the oxygen adsorbed on the surface of the phosphor after firing. When judging from the result of embodiments as will be described later, less content of the oxygen contributes to obtaining the phosphor with high emission intensity. However, if the content of the oxygen to the mass of the phosphor is 5.0 wt % or less, deterioration of the emission intensity is minor, and the phosphor can be sufficiently practicably usable. At this time, the range of value of the oxygen calculated by the material and the mixing ratio in a general formula MmAaBbOoNn:Z of the phosphor is defined as o=1.0 or less.

Note that when comparing the value of the oxygen calculated by a result of composition analysis and the value of the oxygen calculated by the material to be used and the mixing ratio, a slight disagreement occurs. The reason is that when the oxygen is calculated by the material to be used and the mixing ratio the oxygen as will be described below is not taken into consideration, such as the oxygen initially contained in the material, and the oxygen adsorbed on the surface, the oxygen mixed in by the oxidization of the surface of the material when measuring, mixing, and firing the material, and further the oxygen adsorbed on the surface of the phosphor after firing.

Further, in the phosphor having the aforementioned composition formula expressed by MmAaBbOoNn:Z, when element M is the element having+bivalent valency, element A is the element having+tervalent valency, element B is the element having+tetravalent valency, and N is the element having−tervalent valency, m, a, b, o, and n is given as a composition formula expressed by n=2/3m+a+4/3b−2/30. In this composition formula, when the valency of each element is added, the value becomes zero, and the phosphor preferably becomes further stable compound. Particularly, when the composition formula is given as m=1, a=2, 4.0=b/m=5.5, and further preferably given as m=1, a=2, b/m=4.0, it was found that the phosphor having a particularly high emission intensity and having a flat excitation band property with large area on the long wavelength side could be obtained. In any case, a slight disagreement in composition can be allowed, from the composition formula showing the composition of the phosphor.

Meanwhile, the element M is preferably at least one or more kind of element selected from the elements of the group consisting of Mg, Ca, Sr, Ba, and Zn, and the rare earth elements having bivalent valency, is further preferably at least one or more kind of element selected from the elements of the group consisting of Mg, Ca, Sr, Ba, and Zn, and is most preferably the element Ca.

The element A is preferably at least one or more kind of element selected from the elements of the group consisting of B (boron), Al, Ga, In, Tl, Y, So, P, As, Sb, and Bi, is further preferably at least one or more kind of element selected from the elements of the group consisting of B, Al, Ga, and is most preferably the element Al. As the Al, preferably AlN is used as a general thermoelectric material and structural material, is easily available at a low cost, and in addition, has a small environmental load.

The element B is preferably at least one or more kind of element selected from the elements of the group consisting of C, Si, Ge, Sn, Ti, Hf, Mo, W, Cr, Pb, and Zr, is further preferably the elements Si and/or Ge, and is most preferably the element Si. As the Si, preferably $Si_3N_4$, which is nitride, is used as the general thermoelectric material and structural material, is easily available at a low cost, and in addition has a small environmental load.

Note that the element Z will be described later.

Here, in the general formula MmAaBbOoNn:Z of the phosphor according to the present invention, when equations are given as a+b=12, and o+n=16, and the element A is Al, and the element B is Si, the phosphor becomes, what is called, a sialon phosphor. However, in the aforementioned composition range, the sialon phosphor of a new composition having the composition different from the conventional sialon phosphor was obtained. Generally, the sialon is excellent in chemical thermal and mechanical characteristics and chemical stability, and exhibits a high durability even under a severe environment. Therefore, dedicated study on the sialon-based phosphor is performed, and for example, suggestion is made as shown in the patent documents 2 to 5. However, in the sialon phosphor having the conventional composition, as explained in the column of "problem to be solved", the emission efficiency in the excitation light of the near ultraviolet/ultraviolet and blue color does not reach a satisfactory level, and the emission intensity and the luminance are unsatisfactory.

Meanwhile, the phosphor according to the present invention has a parent composition having a plurality of sites of element M which can be substituted by the activator, and realizes a new composition different from the conventional sialon phosphor composition, and the phosphor with high emission intensity and luminance could be obtained. Namely, for example, the sialon phosphor shown in the documents 2 to 5 is expressed by a general formula $Mm_1(Al, Si)_{12}(O, N)_{16}:Z$, where the value of $m_1$ is in the range of $0 \leq m_1 \leq 1.5$. Meanwhile, when the composition range is expressed as described above, the sialon phosphor according to the present invention is expressed by a general formula $Mm_1(Al, Si)_{12}(O, N)_{16}:Z$, satisfying $m_1 > 1.5$, it was found that the phosphor of the present invention includes larger amount of elements M (Ca) compared with the composition of the conventional sialon phosphor, satisfying $1.8 \leq a/m_1 \leq 5.0$, $3.0 \leq b/m_1 \leq 6.2$ in the relation between $m_1$ and a, and $m_1$ and b, further having the characteristic that less content of oxygen allows the emission characteristic to be improved, and exhibiting high emission intensity.

With such characteristics described above, it is considered that the phosphor according to the present invention with new composition is an excellent phosphor even in durability against heat and ultraviolet radiation emitted from the light emitting part (such as LED) of the excitation light, and heat and humidity generated in a step for manufacturing the light source.

The element Z is at least one or more kind of element selected from the rare earth elements or the transition metal elements, which substitutes a part of the element M in the matrix of the phosphor. From the viewpoint of exhibiting a sufficient color rendering properties for various light sources such as white LED using the phosphor according to the present invention, preferably, the emission spectrum of the phosphor has a large half-value width. Also, preferably, from the above-described viewpoint, the element Z is at least one or more kind of element selected from the group consisting of Eu, Mn, Ce, and Tb. Out of such elements, when Eu is used as the element Z, the phosphor emits strong light having an emission spectrum with a peak in the range from yellow color to orange color, the effect to enhance the color rendering properties is exerted, with high emission efficiency. This contributes to realizing a preferable phosphor used for various light sources such as white LED.

Meanwhile, when the element Z is selected, the emission peak wavelength of the phosphor according to the present invention can be varied.

In addition, preferably, an amount of the element Z to be added is in the range of not less than 0.0001 and not more than 0.50 in the molar ratio z/(m+z) of the element N to the element Z, which is the activator, when the phosphor according to the present invention is expressed by a general formula MmAaBbOoNn:Zz (however, m=1, a+b<8, o≤1.0, n=2/3m+a+4/3b−2/3o). When the molar ratio z/(m+z) of the element M to the element Z is in the above-described range, deterioration in the emission efficiency can be averted, which is caused by concentration quenching due to excessive content of the activator (element Z). Meanwhile, the deterioration in the emission efficiency can also be averted, which is caused by insufficient emission contributing element due to inadequate content of the activator (element Z). Further, more preferably, the value of the z/(m+z) is in the range of not less than 0.001 and not more than 0.30. However, an optimal value of the range of the value of the z/(m+z) is slightly fluctuated according to the kind of the activator (element Z) and the kind of the element M. Further, by controlling the amount of the activator (element Z) to be added also, the peak wavelength of the emission of the phosphor can be set so an to be shifted, and this in effective when adjusting the luminance in the light source obtained.

Here, in the phosphor according to the present invention (general formula MmAaBbOoNn:Z), when Ca is selected as the element M, Al is selected as the element A, Si, is selected as the element B, and Eu is selected as the element Z, and expressed by m=1, a=2, 4.0≤b/m≤5.5, o≤1.0, n=2/3m+a+4/3b−2/3o, a weight ratio of the element constituting the phosphor is obtained, with Ca as 8.4 to 13.5 wt %, Al as 11.7 to 17.9 wt %, Si as 29.8 to 41.7 wt %, oxygen as 0 to 5.0 wt %, nitrogen as 30.5 to 37 wt %, and Eu as 0.01 to 5.0 wt % (however, ±1.0 wt % of error is estimated for Ca and Al, ±2.0 wt % of error is estimated for Si, and more preferable range is selected for oxygen and Eu.) At this time, the phosphor exhibits a sufficient emission intensity and also exhibits preferable emission characteristics, having the chromaticity x of the emission in the range from 0.5 to 0.6, and y in the range from 0.4 to 0.5.

Note that the phosphor according to the present invention has a hexagonal crystal structure as will be described later.

The phosphor according to the present invention is easily applicable to various light sources such as the white LED, by making it a powdery form. Here, when using the phosphor in a powdery form, preferably an average particle size of the phosphor is not more than 20 μm. The reason is that since it is considered that the emission mainly occurs on a grain surface in the phosphor powder, if the average particle diameter is not more than 20 μm, the specific surface area per unit weight of the powder can be secured, thereby averting the deterioration in luminance. Further, when the powder is formed in a pasty state, and applied on an emitting element or the like, density of the powder can be increased, and from this viewpoint, the deterioration in luminance can be averted. In addition, according to the study of the inventors et al. of the present invention, although detailed reason is not clarified, it was found that the average particle diameter was preferably larger than 1.0 μm from the viewpoint of the emission efficiency of the phosphor powder. As described above, preferably the average particle diameter of the phosphor powder of the present invention is set to be not less than 1.0 μm and not more than 20 μm.

The phosphor according to the present invention has an emission spectrum with a peak in the range from yellow color to red color (wavelength from 570 nm to 620 nm), and the peak shape is broad. Therefore, from the viewpoint of the color rendering properties, the phosphor of this invention is appropriate for the white light LED phosphor. Further, the excitation band has a flat excitation band with large area in the range from ultraviolet to green color (in the range from 250 nm to 550 nm). Therefore, for example, in either way of the LED systems for obtaining white color, such as the system by using the complementary relation between the blue color emission of the blue LED with high luminance (near the wavelength of 460 nm) and the yellow emission of the phosphor proposed as the one chip-type white LED, or the system by using the mixed state of colors obtained from the phosphors of the R, G, B, and so forth by combining the LED for emitting near ultraviolet/ultraviolet emission (near the emission spectrum with a peak in the range from 380 to 410 nm) the phosphor excited by the near ultraviolet/ultraviolet lights generated from the LED and emitting red color (R), the phosphor emitting green color (G), and the phosphor emitting blue color (B), the phosphor can be used while exhibiting approximately the maximum emission intensity. That is, by combining the emitting part for emitting the light from ultraviolet to blue color and the phosphor sample, the white light source and the white LED with high output and good color rendering properties, and further the illumination unit using the same, can be obtained.

For example, by combining the phosphor according to the present invention changed in a powdery state with the light emitting part (particularly, the light emitting part for emitting the light having an emission spectrum with a peak in the range from 250 nm to 550 nm) by the publicly-known method, various display devices and illumination units can be manufactured. In addition, by combining with a discharge lamp generating ultraviolet light, a fluorescent lamp, the illumination unit and a display device can be manufactured. Also, by combining the phosphor according to the present invention changed in a powdery state with the LED light emitting element for emitting ultraviolet to blue color by the publicly-known method, the illumination unit and the display device can be manufactured.

Next, a manufacturing method of the phosphor according to the present invention will be explained using the manufacture of $CaAl_2Si_4N_8$:Eu (however formula is expressed by Eu/(Ca+Su)=0.050, and $Ca_{0.950}Al_2Si_4N_8$:$Eu_{0.050}$ is thereby obtained.) as an example.

Each nitride raw material of the element M, the element A, and the element B may be a commercially available material. However, higher purity is preferable and the raw material with 2N or more, further preferably with 3N or more to therefore prepared. Preferably, the particle diameter of each particle of the raw material is generally a fine particle from the viewpoint of accelerating reaction. However, the particle diameter and the shape of the phosphor obtained are changed according to the particle diameter and the shape of the raw material. Therefore, by adjusting to the particle diameter required for the phosphor finally obtained, the nitride raw material having the particle approximating to the particle diameter of the phosphor thus obtained may be prepared. Although as the raw material of the element Z, the commercially available nitride raw material, or simple substance metal is preferable, there involves no problem in using oxide, with its small amount to be added. However, higher purity is preferable, and therefore the raw material preferably with the purity of 2N or more, further preferably with the purity of 3N or more is prepared.

For manufacturing the $Ca_{0.950}Al_2Si_4N_8:Eu_{0.050}$, for example, $Ca_3N_2$(2N), AlN(3N), $SiN_4$(3N) may be respectively prepared as the nitride of the element M, the element A, the element B, and $Eu_2O_3$(3N) may be prepared as the element Z. Such raw materials are weighed and mixed, with the mixing ratio of each raw material set to be 0.950/3 mol of $Ca_3N_2$, 2 mol of AlN, 4/3 mol for $Si_3N_4$, and 0.050/2 mol of $Eu_2O_3$, so that the molar ratio of each element becomes Ca:Al:Si:Eu=0.950:2:4:0.050. Such weighing and mixing of the raw materials is properly performed in a glove-box under an inert atmosphere, because the $Ca_3N_2$ is apt to be oxidized. In addition, the nitride of each raw material element is easily influenced by humidity, and therefore the inert gas from which the humidity is sufficiently removed is preferably used. A mixing system may be either way of a wet type or dry type. However, when pure water is used as the solvent of the wet type mixing, the raw material is decomposed, and therefore proper organic solvent needs to be selected. As a device, usual device such as a ball mill and a mortar may be used.

The raw material thus mixed is put in a crucible, retained in the inert atmosphere such as nitrogen at 1000° C. or more, preferably at 1500° C. or more, further preferably at 1600° C. or more for 3 hours, and fired. The higher the firing temperature is, the more rapidly the firing is advanced, and the retaining time is therefore shortened. Meanwhile, even when the firing temperature is low, the target emission characteristics can be obtained by maintaining the temperature for a long time. However, the longer the firing time is, the more rapidly particle growth is advanced, and the particle diameter becomes therefore large. Therefore, the firing time may be set in accordance with the target particle diameter. The crucible may be used, such as an $Al_2O_3$ crucible, a $Si_3N_4$ crucible, an AlN crucible, a sialon crucible, a C (carbon) crucible, and a BN (boron nitride) crucible which can be used in the inert atmosphere. However, when the BN crucible is used, preferably intrusion of impurities from the crucible can be averted.

After completing firing, a fired matter is taken out from the crucible. Then, by using a granulating means such as the mortar and the ball mill or the like, the fired matter is granulated to obtain a prescribed average particle diameter, and the phosphor expressed by the composition formula $Ca_{0.950}Al_2Si_4N_8:Eu_{0.050}$ can be manufactured. Here, $Eu_2O_3$ is used as the raw material of Eu. Therefore, oxygen, although in a small quantity, is added and the composition formula is therefore expressed by $Ca_{0.950}Al_2Si_4O_{0.075}N_{7.917}:Eu_{0.050}$, which poses no problem in particular. Note that when oxygen added in a manufacturing step is reduced, Eu metal or Eu nitride may be used as the raw material of the Eu.

When other element is used as the element M, the element A, the element B, and the element Z, and when an amount of activator Eu is changed, the phosphor can be manufactured by the aforementioned similar manufacturing method, by adjusting the blending quantity at feeding of each material to a prescribed composition ratio.

Embodiment

The present invention will be more specifically explained, based on the embodiments.

Embodiment 1

Commercially available $Ca_3N_2$(2N). AlN(3N), $Si_3N_4$(3N), and $Eu_2O_3$(3N) were prepared, and each raw material was weighed to obtain 0.950/3 mol of $Ca_3N_2$, 2 mol of AlN, 4/3 mol of $Si_3N_4$, and 0.050/2 mol of $EU_2O_3$, and the raw material thus weighed was placed in the glove-box under a nitrogen atmosphere and mixed by using the mortar. The raw material thus mixed was put in the crucible, and retained/fired for 3 hours at 1700° C. in the nitrogen atmosphere. Thereafter, the raw material thus fired was cooled from 1700° C. to 200° C. for 1 hour, to obtain the phosphor according to an embodiment 1 expressed by the composition formula $Ca_{0.950}Al_2Si_4O_{0.075}N_{7.917}:Eu_{0.050}$. Note that the composition formula thus obtained is the composition estimated by the raw material used and a blending ratio. An analysis result of the phosphor powder thus obtained is shown by Table 1.

The phosphor thus obtained has a specific surface area of 1.487 $m^2/g$, containing 1.28 wt % oxygen. Also, the average particle diameter (D50) is 4.89 μm, that is, not less than 1.0 μm and not more than 20 μm which is a preferable range as the white LED phosphor.

TABLE 1

| Composition formula | Ca (wt %) | Al (wt %) | Si (wt %) | N (wt %) | Eu (wt %) | O (wt %) | [illegible] | Average diameter (D50) | Surface area |
|---|---|---|---|---|---|---|---|---|---|
| $Ca_{0.950}Al_2Si_4O_{0.075}N_{7.917}$: $Eu_{0.050}$ | 11.8 | 16.2 | 34.1 | 34.8 | 1.67 | 1.28 | 0.15 | 4.89 μm | 1.487 $m^2/g$ |

Next, the emission spectrum of the phosphor according to the embodiment 1 was measured. The measured result is shown in Table 2 and will be explained with reference to the FIG. 2.

Figure 2:
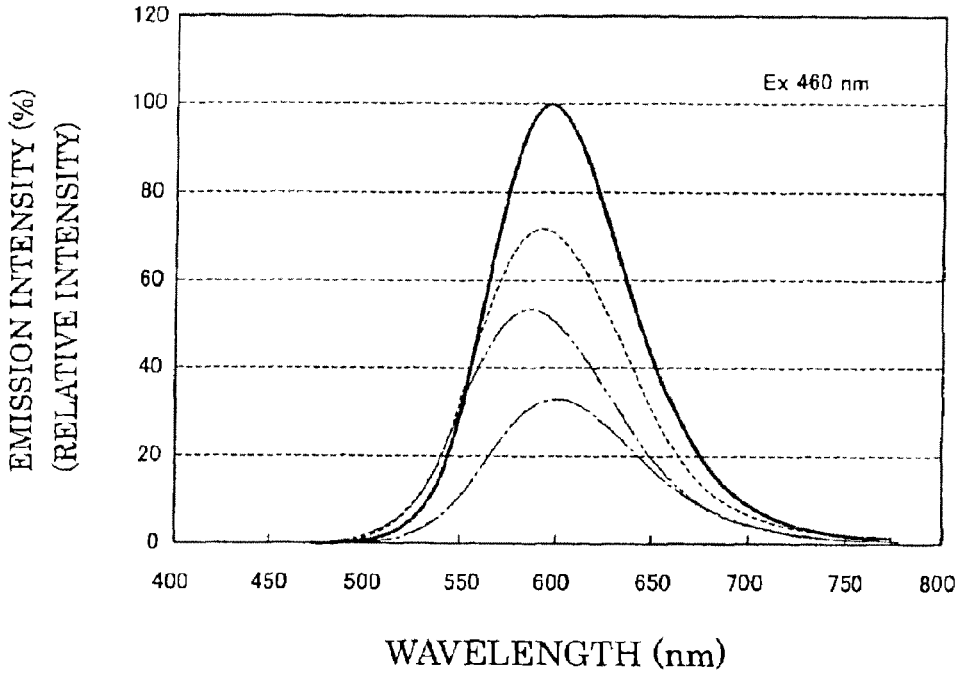
FIG. 2 is a graph showing an emission spectrum of the phosphor according to an embodiment and a comparative example.

First, by using FIG. 2, the emission spectrum of the phosphor will be explained. Note that FIG. 2 is a graph showing the relative emission intensity of the phosphor in the ordinate, and the light wavelength in the abscissa. Here, the emission spectrum is the spectrum released from an object, when the object is irradiated with light of a certain wavelength or energy. FIG. 2 shows the spectrum of the light emitted from the phosphor by using a thick solid line, when the phosphor of the embodiment 1 is irradiated with a monochlomatic light having an emission spectrum with a peak at 460 nm as an excitation light.

As is clearly shown in FIG. 2, the phosphor has a broad emission peak in the wide wavelength range from 500 nm to 800 nm, exhibiting highest emission intensity at 598.3 nm. (Emission intensity and luminance at this time, each being defined as 100% of relative intensity.) The half-width value was obtained to be 84 nm. In addition, the chromaticity (x, y) of the emission was measured, and x and y are expressed by x=0.557, and y=0.440. Further, orange emission color was visually confirmed. Also, the phosphor according to the embodiment 1 has a peak with wide half value width in a wide wavelength region, and therefore when used as the one chip type white LED phosphor, the white LED having excellent color rendering properties can be prepared compared with the one using the phosphor having a sharp peak.

Figure 3:
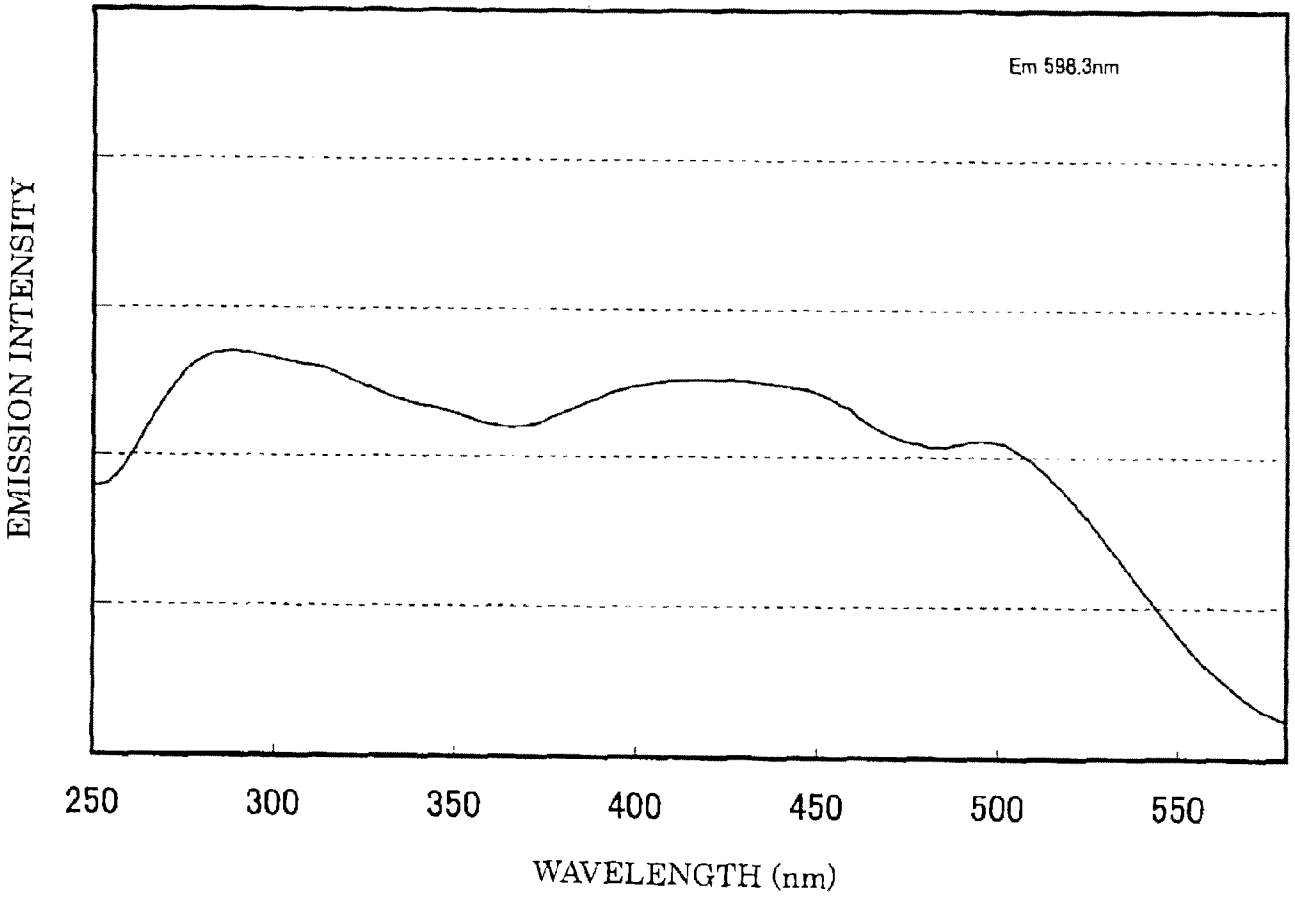
FIG. 3 is a graph showing an excitation spectrum of the phosphor according to the embodiment.

Next, by using FIG. 3, an excitation spectrum of the phosphor according to the embodiment 1 will be explained. FIG. 3 is a graph showing the relative emission intensity of the phosphor in the ordinate, and the wavelength of the light in the abscissa. Here, the excitation spectrum is the graph exhibiting the excitation wavelength dependency of the emission intensity at fixed wavelength, when the phosphor to be measured is excited by the monochromatic light of various wavelengths. In this measurement, the phosphor according to the embodiment 1 is irradiated with the monochromatic light of the wavelength range from 250 nm to 580 nm, and the excitation dependency of the emission intensity-of the light of 598.3 nm wavelength emitted from the phosphor was measured.

As in clearly shown in FIG. 3, it was found that the phosphor emits the orange emission with high intensity when excited by the light with a peak in the wide range from 250 nm or around to 550 nm. From this result, the phosphor according to the embodiment 1 is the phosphor capable of emitting light with high efficiency, even when either of the blue LED (excitation wavelength of 460 nm or around) or the near ultraviolet/ultraviolet LED (excitation wavelength from 380 to 410 nm or around) considered to be the excitation LED of the one chip type white LED, is used as the excitation light.

The phosphor according to the present invention was measured by a powder X-ray diffractometry and structure of the crystal was analyzed by using a powder X-ray Rietbert method based on a diffraction result thus obtained. The Rietbert method is the method to obtain a more precise crystal structure by comparing an actual measuring diffraction strength obtained by actually measuring the powder X-ray diffraction, and the diffraction strength obtained by theoretical calculation from a crystal structure model constructed by estimating the crystal structure, and making various structure parameters in the latter model precise by using a least square method so as to make a difference between the actual diffraction strength and the diffraction strength obtained by calculation small. Here, the crystal structure model was constructed and the structure parameters were made to be precise by the Rietbert method in the phosphor according to the present invention. Note that a program "RINTAN-2000" was used for the Rietbert diffraction. The result is shown in FIG. 1. FIG. 1 is a graph showing an angle 2θ of X-ray in the abscissa, and the intensity of the X-ray in the ordinate. In the graph, the diffraction result (broken line) by the Rietbert method and the actual measured result (thick solid line) are respectively described in sequence beginning from the upper one. As is clearly shown in FIG. 1, a very favorable agreement could be obtained between the diffraction result and the actual result, and it was found that the phosphor $Ca_{0.950}Al_2Si_4O_{0.075}:Eu_{0.050}$ had the crystal structure of a hexagonal system structure belonging to P31c space group. In addition, the value of the a-axis was 7.960, and the value of the c-axis was 5.774.

TABLE 2

| | Composition formula | Excitation wavelength | Emission strength | Luminance | Peak wavelength | Chromaticity x | Chromaticity y |
|---|---|---|---|---|---|---|---|
| Embodiment 1 | $Ca_{0.950}Al_2Si_4O_{0.075}N_{7.917}:Eu_{0.050}$ | 460 nm | 100.0% | 100.0% | 598.3 nm | 0.557 | 0.440 |
| Comparative example 1 | $Ca_{0.38}Al_{2.25}Si_{9.75}O_{0.75}N_{15.25}:Eu_{0.25}$ | 460 nm | 28.4% | 29.6% | 601.9 nm | 0.556 | 0.440 |
| Comparative example 2 | $Ca_{0.405}Al_{1.35}Si_{10.65}O_{0.45}N_{15.55}:Eu_{0.045}$ | 460 nm | 46.3% | 57.4% | 587.8 nm | 0.516 | 0.478 |
| Comparative example 3 | $Ca_{0.950}Al_2Si_{10}O_{0.075}N_{15.92}:Eu_{0.050}$ | 460 nm | 74.8% | 86.3% | 593.1 nm | 0.534 | 0.461 |

COMPARATIVE EXAMPLE 1

The phosphor expressed by the composition formula Ca0.38 $Al_{2.25}Si_{9.75}O0.75N_{15.25}:Eu_{0.28}$ was prepared and defined as a comparative example 1.

The phosphor according to the comparative example 1 was prepared as will be described below.

The commercially available reagents of $CaCO_3$(3N), AlN (3N), $Si_3N_4$(3N), and $Eu_2O_3$(3N) were prepared as the raw materials. Then, the raw materials thus prepared were respectively weighed so that the molar ratio of each element was expressed by Ca:Al:Si:Eu=0.38:2.25:9.75:0.25, and mixed by using the mortar in the glove-box under the nitrogen atmosphere. The raw materials thus mixed were put in the BN crucible, retained in the inert atmosphere such as nitrogen at 1700° C. for 3 hours and fired, and thereafter cooled from 1700° C. to 200° C. for 1 hour, to obtain the phosphor expressed by the composition formula $$Ca_{0.38}Al_{2.25}Si_{9.75}O_{0.75}N_{15.25}:Eu_{0.25}.$$

Next, in the same way as the embodiment 1, the emission spectrum of the phosphor according to the comparative example 1 was measured. The measured result is shown in Table 2 and in FIG. 2 by using one-dot chain line. As is clearly shown in FIG. 2, the phosphor according to the comparative example 1 has a broad peak and exhibits highest emission intensity with a peak at 601.9 nm, and the relative intensity of the emission intensity was 28.4% and the relative intensity of the luminance was 29.6% when the relative intensity of the embodiment 1 was set to be 100%. The chromaticity (x, y) of the emi8sion was x=0.556 and y=0.440. Note that the orange emission color was visually confirmed.

COMPARATIVE EXAMPLE 2

The phosphor expressed by $Ca_{0.405}Al_{1.35}Si_{10.65}O_{0.45}N_{15.53}:Eu_{0.045}$ (Eu/(Ca+Eu)=0.10) was prepared and defined as a comparative example 2.

The phosphor according to the comparative example 2 was prepared as will be described below.

The commercially available reagents of $CaCO_3$(3N), AlN (3N). $Si_3N_4$(3N), and $Eu_2O_3$(3N) were prepared as the raw materials. Then, the raw materials thus prepared were respectively weighed so that the molar ratio of each element was expressed by Ca:Al:Si:Eu=0.405:1.35:10.65:0.045, and mixed by using the mortar in the glove-box under the nitrogen atmosphere. The raw materials thus mixed were put in the crucible retained in the inert atmosphere such as nitrogen at 1700° C. for 3 hours and fired, and thereafter cooled from 1700° C. to 200° C. for 1 hour, to obtain the phosphor expressed by the composition formula $$Ca_{0.405}Al_{1.35}Si_{10.65}O_{0.45}N_{15.53}:Eu_{0.045}$$
$$(Eu/(Ca+Eu)=0.10)$$

Next, in the same way as the embodiment 1, the emission spectrum of the phosphor according to the comparative example 2 was measured. The measured result is shown in Table 2, and in FIG. 2 by using two-dot chain line. As is clearly shown in FIG. 2, the phosphor according to the comparative example 2 has a broad peak and exhibits mission spectrum with a peak at 587.8 nm, and the relative intensity of the emission intensity was 46.3% and the relative intensity of the luminance was 57.4%, when the relative intensity of the embodiment 1 was defined as 100%. The chromaticity (x, y) of the emission was expressed by x=0.516 and y=0.478. Note that the yellow emission color was visually confirmed.

COMPARATIVE EXAMPLE 3

The phosphor expressed by $Ca_{0.95}Al_2Si_{10}O_{0.075}N_{15.92}$: $Eu_{0.050}$ (Eu/(Ca+Eu)−0.05) was prepared and defined as a comparative example 3.

The phosphor according to the comparative example 3 was prepared as will be described below.

The commercially available reagents of $Ca_3N_2$(2N), AlN (3N), $Si_3N_4$(3N), and $Eu_2O_3$(3N) were prepared as the raw materials. Then, the raw materials thus prepared were respectively weighed so that the molar ratio of each element was expressed by Ca:Al:Si:Eu=0.950:2.0:10.0:0.050, and mixed by using the mortar in the glove-box under the nitrogen atmosphere. The raw materials thus mixed were put in the crucible, retained in the inert atmosphere such as nitrogen at 1700° C. for 3 hours and fired, and thereafter cooled from 1700° C. to 200° C. for 1 hour, to obtain the phosphor expressed by the composition formula $$Ca_{0.950}Al_2Si_{10}O_{0.075}N_{15.92}:Eu_{0.050}(Eu/(Ca+Eu)=0.05)$$

Next, in the same way as the embodiment 1, the emission spectrum of the phosphor according to the comparative example 3 was measured. The measured result is shown in Table 2, and in FIG. 2 by using broken line. As is clearly shown in FIG. 2, the phosphor according to the comparative example 3 has a broad peak and exhibits emission spectrum with a peak at 593.1 nm, and the relative intensity of the emission intensity was 74.8% and the relative intensity of the luminance was 86.3%, when the relative intensity of the embodiment 1 was defined as 100%. The chromaticity (x, y) of the emission was expressed by x=0.534 and y=0.461. Note that the yellow emission color was visually confirmed.

Study on the (Embodiment 1) and the (Comparative Examples 1 to 3)

As is clearly shown in the composition formula of Table 2, it can be considered that the phosphor of the present invention having a new composition according to the embodiment 1 has less content of oxygen differently from the sialon phosphor of the comparative examples 1 and 2, and further the phosphor of the present invention having a new composition according to the embodiment 1 has a lot of sites of the element M which can be substituted by the activator, thus having a high emission intensity and luminance.

As is clearly shown in the composition formula of Table 2 and FIG. 2, it was found that the phosphor according to the present invention exhibits about 1.3 to 3.5 times emission intensity, and about 1.2 to 3.3 times luminance, compared with the phosphor according to the comparative examples 1 to 3, thus realizing the phosphor with high efficiency exhibiting high emission intensity and luminance.

Embodiment 2

In the embodiment 2, change in the emission intensity and the luminance was measured, when the concentration of the activator, element Z (Nu) is changed in the phosphor expressed by the composition formula $CaAl_2Si_4N_3$:Eu according to the present invention. Here, in the manufacture of the measurement sample, the mixing ratio of Ca and Eu was adjusted so as to obtain the relation between the activator Eu and Ca expressed by m+z=1. Then, the mixing ratio of each raw material of $Ca_3N_2$(2N), AlN(3N), $Si_3N_4$(3N), $Eu_2O_3$(3N) explained in the embodiment 1 was adjusted, a phosphor sample was manufactured in the same way as the embodiment 1 other than setting a firing temperature at 1750° C., and the emission intensity and the luminance of the phosphor thus manufactured were measured. However, adjusted Eu/(Ca+Eu) was set to be 0.010, 0.030, 0.040, 0.050, 0.060, 0.070, 0.100, and 0.200.

Figure 4:
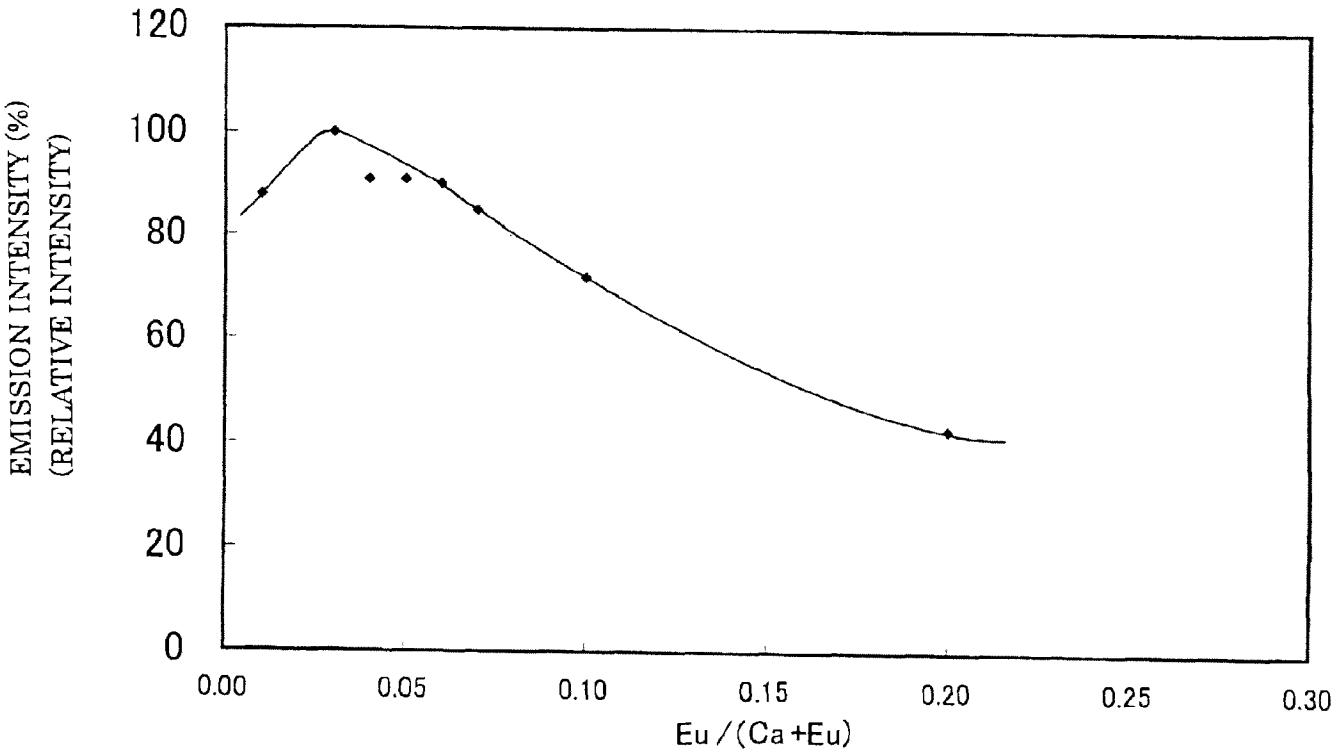
FIG. 4 is a graph showing the change in emission intensity when the concentration of an activator element Z is changed.

The measured result is shown in Table 3 and FIG. 4. Here, FIG. 4 is a graph showing the relative emission intensity of the phosphor sample in the ordinate, and the value of the blending ratio Eu/(Ca+Eu) of Ca and Eu in the abscissa. Note that in the emission intensity and the luminance, the value at Eu/(Ca+Eu)=0.030 was defined as 100%, and the light having an emission spectrum with a peak at 460 nm was used for excitation.

As will be clarified from the results of Table 3 and FIG. 4, in the region with small Eu/(Ca+Eu) value, the emission intensity and the luminance are elevated along with the increase in the value of the Eu/(Ca+Eu). However, the emission intensity and the luminance are decreased along with the increase in the value of the Eu/(Ca+Eu), with a peak at 0.030 or around. The reason is that the activator element is insufficient in the part smaller than 0.030, and therefore in the part larger than 0.030, the concentration quenching due to the activator element is observed.

Meanwhile, as is clearly shown in the result of Table 3, it was confirmed that the value of the peak wavelength was shifted to the long wavelength side.

Note that along with the measurement of the emission intensity and the luminance, the chromaticity (x, y) of the emission was also measured. The result is shown in Table 3.

TABLE 3

| Composition formula | Eu/(Ca + Eu) | Emission intensity | Luminance | Peak wavelength | Chromaticity x | Chromaticity y |
|---|---|---|---|---|---|---|
| $Ca_{0.990}Al_2Si_4O_{0.015}N_{7.983}$: $Eu_{0.010}$ | 0.010 | 87.8% | 94.4% | 588.8 nm | 0.531 | 0.465 |
| $Ca_{0.970}Al_2Si_4O_{0.045}N_{7.950}$: $Eu_{0.030}$ | 0.030 | 100.0% | 100.0% | 594.4 nm | 0.548 | 0.449 |
| $Ca_{0.960}Al_2Si_4O_{0.060}N_{7.933}$: $Eu_{0.040}$ | 0.040 | 90.9% | 88.6% | 595.6 nm | 0.554 | 0.444 |
| $Ca_{0.950}Al_2Si_4O_{0.073}N_{7.917}$: $Eu_{0.050}$ | 0.050 | 90.8% | 86.6% | 596.1 nm | 0.559 | 0.439 |
| $Ca_{0.940}Al_2Si_4O_{0.090}N_{7.900}$: $Eu_{0.060}$ | 0.060 | 90.0% | 84.7% | 598.4 nm | 0.562 | 0.436 |
| $Ca_{0.930}Al_2Si_4O_{0.105}N_{7.883}$: $Eu_{0.070}$ | 0.070 | 84.9% | 78.6% | 600.9 nm | 0.565 | 0.433 |
| $Ca_{0.900}Al_2Si_4O_{0.150}N_{7.833}$: $Eu_{0.100}$ | 0.100 | 71.7% | 64.2% | 603.5 nm | 0.571 | 0.427 |
| $Ca_{0.800}Al_2Si_4O_{0.300}N_{7.687}$: $Eu_{0.200}$ | 0.200 | 42.6% | 35.5% | 610.6 nm | 0.585 | 0.413 |

Embodiment 3

In the embodiment 3, in the phosphor according to the present invention expressed by $Ca_{0.950}AlaSi_4Nn:E_{0.050}$ (Eu/(Ca+Eu)=0.050, n=2/3m+a+4/3b−2/3o), a/m ratio was changed and in this condition, the change in the emission intensity and the luminance was measured (here, a/m and Al/Ca denotes the same meaning and further, the value of m (=Ca) is the value when the equation is established as Eu/(Ca+Eu)=0, that is, in the aforementioned composition formula, the equation is expressed by m=1.0.). Here, in the manufacture of the measurement sample, the phosphor sample was manufactured in the same way as the embodiment 1, other than adjusting the mixing ratio of only AlN(3N) out of each of the raw materials of $Ca_3N_2$(2N), AlN(3N), $Si_3N_4$ (3N), and $Eu_2O_3$(3N) explained in the embodiment 1. Then, the emission intensity and the luminance of the phosphor thus manufactured were measured. However, the molar ratios of Al and Ca were set to be Al/Ca=4.0, Al/Ca=3.0, Al/Ca=2.75, Al/Ca=2.5, Al/Ca=2.25, Al/Ca=1.95, Al/Ca=1.90, Al/Ca=1.85, Al/Ca=1.80, Al/Ca=1.7, Al/Ca=1.6, Al/Ca=1.5, and Al/Ca=1.25.

Figure 5:
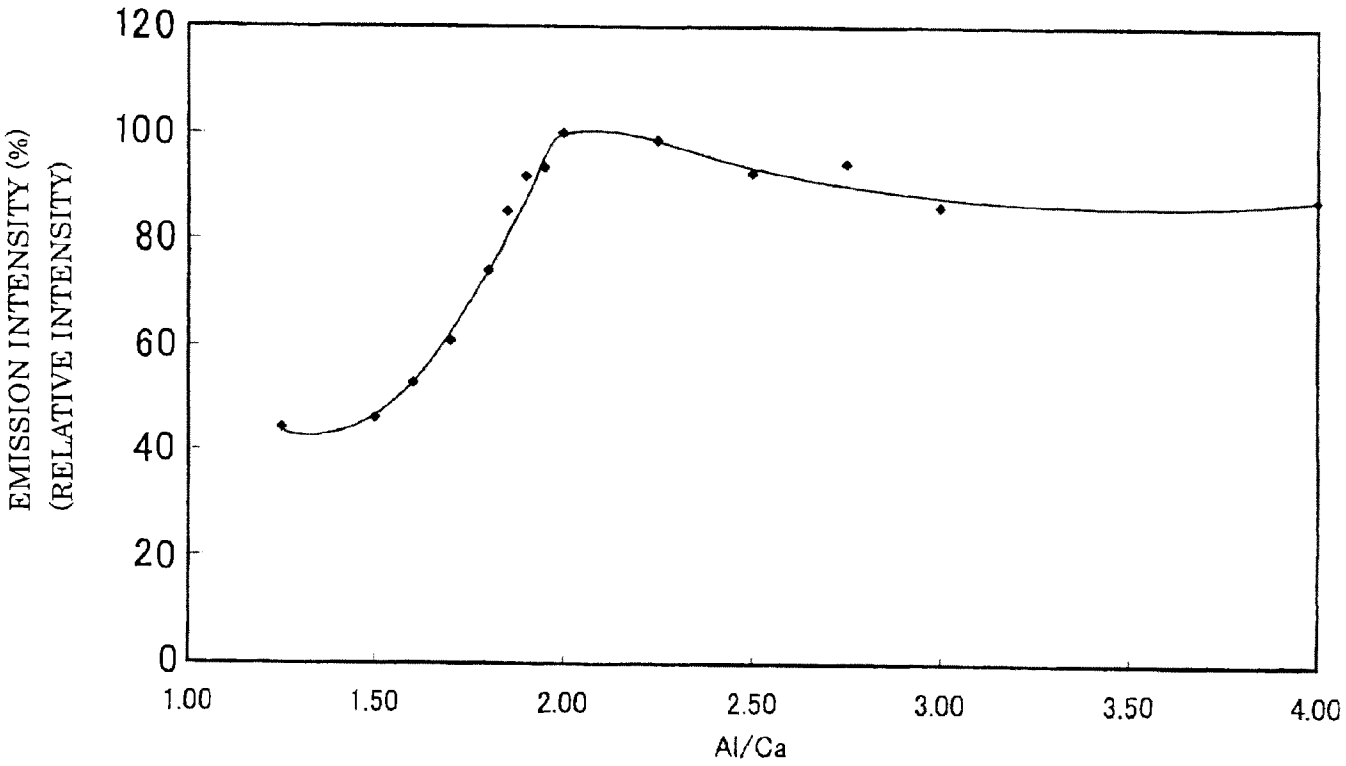
FIG. 5 is a graph showing the change in the emission intensity when Al/Ca ratio is changed.

The measured result is shown in Table 4 and FIG. 5. Here, FIG. 5 is a graph showing the relative intensity of the emission intensity of the phosphor sample in the ordinate, and the value of the blending ratio Al/Ca of Ca and Al in the abscissa. Note that in the emission intensity and the luminance, the value at Al/Ca=2.0 is defined as 100%. Then, the result of adjusting the value of Al/Ca to 1.25 to 4.00 in shown. Note that the light having an mission spectrum with a peak at 460 nm was used as an excitation.

As is clearly shown in the result of Table 4 and FIG. 5, in the region with a small value of Al/Ca, the emission intensity and the luminance are elevated along with the increase in the value. However, the emission intensity and the luminance are decreased, with a peak at Al/Ca=2.0 or around.

The reason is considered to be that if the Al/Ca is greatly deviated from Al/Ca=2.0, a non-reactive raw material is remained in the phosphor after firing, and impurity phase is thereby generated, and further the crystalinity of the matrix structure of the phosphor is reduced that causes to lower X-ray diffraction peak strength, resulting in the collapse of the structure suitable for the emission. Such a residue of the non-reactive raw material and the generation of the impurity phase, and reduction in the crystalinity can be confirmed by measuring the phosphor sample after firing by the powder X-ray diffractometry. If the Al/Ca is beyond 2.0, the AlN, which is the non-reactive raw material, shows a diffraction peak. Meanwhile, if the Al/Ca is less than 2.0, the diffraction peak in the Bragg angle (26) which is different from the peak position of the raw material appears, and therefore the impurity phase in considered to be generated. Further, the crystalinity is considered to be reduced because the peak strength is gradually decreased, as the Al/Ca is separated from 2.0. Although the AlN is remained as the non-reactive raw material when the equation is established as Al/Ca=2.0 or more, the influence is relatively minor on the reduction in the emission intensity and the luminance, and even at Al/Ca=4.0, 80% or more value of the emission intensity and the luminance of Al/Ca=2.0 is obtained.

TABLE 4

| Composition formula | Al/Ca | Emission intensity | Luminance | peak wavelength | Chromaticity x | Chromaticity y |
|---|---|---|---|---|---|---|
| $Ca_{0.950}Al_{4.00}Si_4O_{0.075}N_{9.917}$: $Eu_{0.050}$ | 4.00 | 87.7% | 88.3% | 596.8 nm | 0.555 | 0.442 |
| $Ca_{0.950}Al_{3.00}Si_4O_{0.075}N_{8.917}$: $Eu_{0.050}$ | 3.00 | 86.1% | 86.5% | 596.8 nm | 0.556 | 0.442 |
| $Ca_{0.950}Al_{2.75}Si_4O_{0.075}N_{8.667}$: $Eu_{0.050}$ | 2.75 | 94.2% | 94.1% | 597.5 nm | 0.557 | 0.441 |
| $Ca_{0.950}Al_{2.50}Si_4O_{0.075}N_{8.417}$: $Eu_{0.050}$ | 2.50 | 92.4% | 92.3% | 597.5 nm | 0.557 | 0.440 |
| $Ca_{0.950}Al_{2.25}Si_4O_{0.075}N_{8.167}$: $Eu_{0.050}$ | 2.25 | 98.6% | 98.2% | 597.5 nm | 0.558 | 0.440 |
| $Ca_{0.950}Al_{2.00}Si_4O_{0.075}N_{7.817}$: $Eu_{0.050}$ | 2.00 | 100.0% | 100.0% | 598.3 nm | 0.557 | 0.440 |
| $Ca_{0.950}Al_{1.95}Si_4O_{0.075}N_{7.867}$: $Eu_{0.050}$ | 1.95 | 93.4% | 93.3% | 599.7 nm | 0.560 | 0.437 |

TABLE 4-continued

| Composition formula | Al/Ca | Emission intensity | Luminance | peak wavelength | Chromaticity x | y |
|---|---|---|---|---|---|---|
| $Ca_{0.950}Al_{1.90}Si_4O_{0.075}N_{7.817}$: $Eu_{0.050}$ | 1.90 | 91.8% | 93.0% | 597.1 nm | 0.555 | 0.442 |
| $Ca_{0.950}Al_{1.85}Si_4O_{0.075}N_{7.767}$: $Eu_{0.050}$ | 1.85 | 85.1% | 87.5% | 597.1 nm | 0.552 | 0.445 |
| $Ca_{0.950}Al_{1.80}Si_4O_{0.075}N_{7.717}$: $Eu_{0.050}$ | 1.80 | 73.9% | 77.7% | 594.9 nm | 0.548 | 0.449 |
| $Ca_{0.950}Al_{1.70}Si_4O_{0.075}N_{7.617}$: $Eu_{0.050}$ | 1.70 | 60.9% | 65.2% | 595.0 nm | 0.545 | 0.452 |
| $Ca_{0.950}Al_{1.90}Si_4O_{0.075}N_{7.517}$: $Eu_{0.050}$ | 1.60 | 52.9% | 57.6% | 593.3 nm | 0.542 | 0.455 |
| $Ca_{0.950}Al_{1.90}Si_4O_{0.075}N_{7.417}$: $Eu_{0.050}$ | 1.50 | 46.1% | 51.2% | 593.3 nm | 0.539 | 0.457 |
| $Ca_{0.950}Al_{1.25}Si_4O_{0.075}N_{7.197}$: $Eu_{0.050}$ | 1.25 | 44.2% | 47.5% | 594.6 nm | 0.544 | 0.452 |

Embodiment 4

In the embodiment 4, in the phosphor according to the present invention expressed by $Ca_{0.950}Al_2SibNn:Eu_{0.050}$ (Eu/(Ca+Eu)=0.050, n=2/3m+a+4/3b−2/3o), b/m ratio was changed and in this condition, change in the emission intensity and the luminance was measured (here, b/m and Si/Ca denotes the same meaning and further, the value of m (=Ca) is the value when the equation is established as Eu/(Ca+Eu)=0, that is, in the aforementioned composition formula, the equation is expressed by m=1.0.). Here, in the manufacture of the measurement sample, the phosphor sample was manufactured in the same way as the embodiment 1, other than adjusting the mixing ratio of only $Si_3N_4$(3N) out of each of the raw materials of $Ca_3N_2$(2N), AlN(3N), $Si_3N_4$(3N), and $Eu_2O_3$ (3N) explained in the embodiment 1. Then, the emission intensity and the luminance of the phosphor thus manufactured were measured. However, the molar ration of Si and Ca were set to be Si/Ca=3.5, Si/Ca=4.0, Si/Ca=4.25, Si/Ca=4.50, Si/Ca=5.00, Si/Ca=5.50, Si/Ca=6.00, and Si/Ca=6.50.

Figure 6:
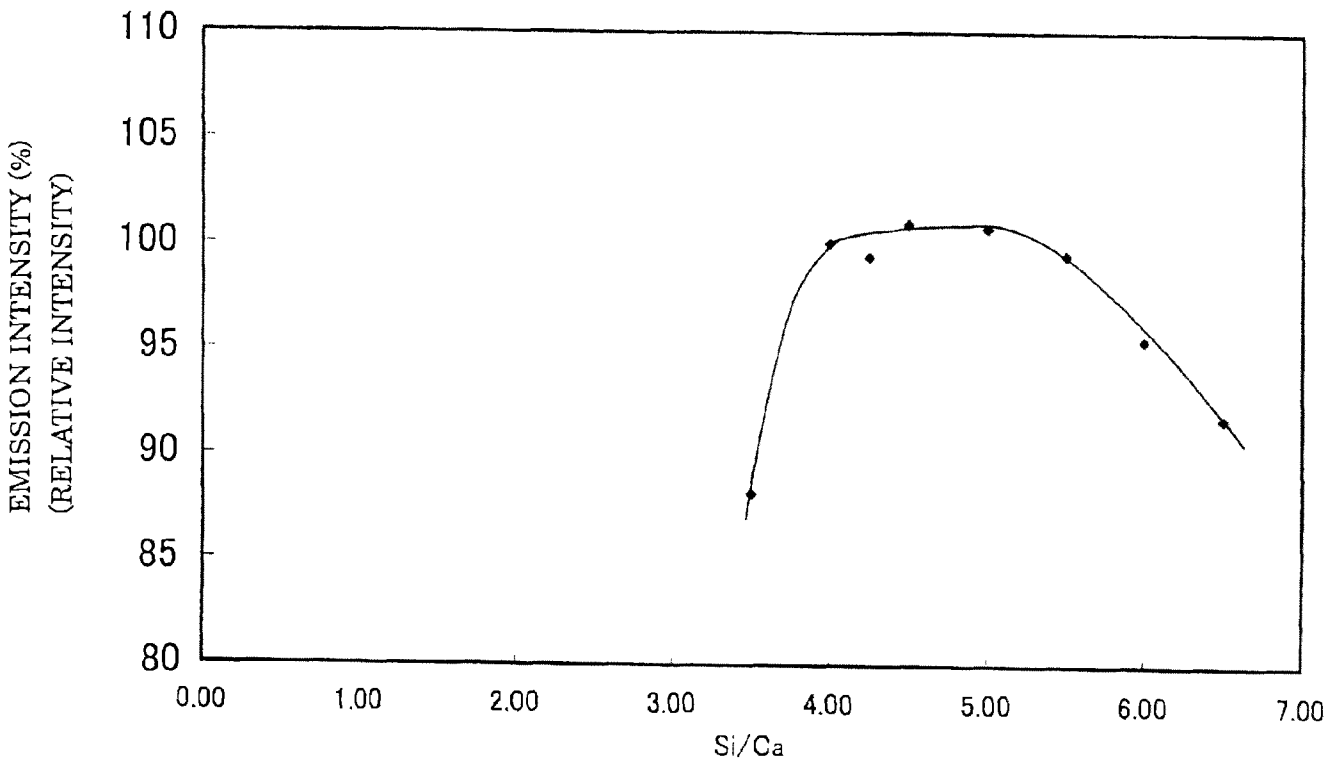
FIG. 6 is a graph showing the change in the emission intensity when Si/Ca ratio is changed.

The measured result will be explained with reference to Table 5 and FIG. 6. Here, FIG. 6 is a graph showing the relative intensity of the emission intensity of the phosphor sample in the ordinate, and the value of the blending ratio Si/Ca of Ca and Si in the abscissa. Note that in the emission intensity and the luminance, the value at Si/Ca=4.0 are defined as 100%. Then, the result of adjusting the value of Si/Ca from 3.5 to 6.5 is shown. Note that the light having an emission spectrum with a peak at 460 nm was used for excitation.

As is clearly shown in the result of FIG. 6, in the region with small value of Si/Ca, the emission intensity is elevated along with the increase in the value of Si/Ca, showing the peak at 4.0. Then, the peak value is maintained up to 5.5, and when beyond 5.5, the emission intensity is lowered onward.

The reason is considered to be that in the same way as explained for Al/Ca in the embodiment 3, when the Si/Ca value is greatly deviated from Si/Ca=4.0 or around, the non-reacted raw material is remained in the phosphor after firing, the impurity phase is generated, and further the crystalinity of the matrix structure is reduced, which causes lower X-ray diffraction peak strength, resulting in the collapse of the structure suitable for the emission.

In addition, the luminance has a peak at around 4.5 to 5.5 of Si/Ca value, and further in this range, both of the emission intensity and the luminance are more increased than those when the equation is established as Si/Ca=4.0.

TABLE 5

| Composition formula | Si/Ca | Emission intensity | Luminance | Peak wavelength | Chromaticity x | y |
|---|---|---|---|---|---|---|
| $Ca_{0.950}Al_2Si_{3.50}O_{0.075}N_{7.250}$: $Eu_{0.050}$ | 3.50 | 88.1% | 89.3% | 600.0 nm | 0.559 | 0.438 |
| $Ca_{0.950}Al_2Si_{4.00}O_{0.075}N_{7.917}$: $Eu_{0.050}$ | 4.00 | 100.0% | 100.0% | 598.3 nm | 0.557 | 0.440 |
| $Ca_{0.950}Al_2Si_{4.25}O_{0.075}N_{8.250}$: $Eu_{0.050}$ | 4.25 | 99.3% | 99.4% | 598.9 nm | 0.557 | 0.440 |
| $Ca_{0.950}Al_2Si_{4.80}O_{0.075}N_{8.583}$: $Eu_{0.050}$ | 4.50 | 100.9% | 101.8% | 598.8 nm | 0.557 | 0.441 |
| $Ca_{0.950}Al_2Si_{5.00}O_{0.075}N_{9.250}$: $Eu_{0.050}$ | 5.00 | 100.7% | 103.3% | 599.3 nm | 0.555 | 0.442 |
| $Ca_{0.950}Al_2Si_{5.50}O_{0.075}N_{9.917}$: $Eu_{0.050}$ | 5.50 | 99.5% | 103.1% | 598.3 nm | 0.554 | 0.443 |
| $Ca_{0.950}Al_2Si_{6.00}O_{0.075}N_{10.58}$: $Eu_{0.050}$ | 6.00 | 95.4% | 99.9% | 598.3 nm | 0.553 | 0.444 |
| $Ca_{0.950}Al_2Si_{6.50}O_{0.075}N_{11.25}$: $Eu_{0.050}$ | 6.50 | 91.7% | 97.4% | 598.3 nm | 0.550 | 0.446 |

Embodiment 5

In the embodiment 5, change in the emission intensity and the luminance when oxygen concentration was changed was measured, in the phosphor sample according to the present invention expressed by $Ca_{1.005}Al_{2.5}Si_5O_{0.080}N_{9.782}:Eu_{0.055}$ (Eu/(Ca+Eu)=0.050). Here, in the manufacture of the measurement sample, by substituting the $SiO_2$ for a part of the $Si_3N_4$(3N) out of the $Ca_3N_2$(2N), AlN(3N), $Si_3N_4$(3N), $Eu_2O_3$(3N), respectively, each of the raw material was weighed, so that the molar ratio of each element was expressed by Ca:Al:Si:Eu=1.005:2.5:5.0:0.055. Other than this, the phosphor sample was manufactured in the same way as the embodiment 1, and the emission intensity and the luminance were measured.

However, the substitution of the $SiO_2$ for the part of the $Si_3N_4$(3N) was performed by substituting the $SiO_2$ raw material for 5.0% of Si required, substituting the $SiO_2$ raw material for 10.0% of the Si required, substituting the $SiO_2$ raw material for 25.0% of the Si required, substituting the $SiO_2$ raw material for 50.0% of the Si reqiired, substituting the $SiO_2$ raw material for 75.0% of the Si required, and substituting the $SiO_2$ raw material for 100.0% of the Si required.

Figure 7:
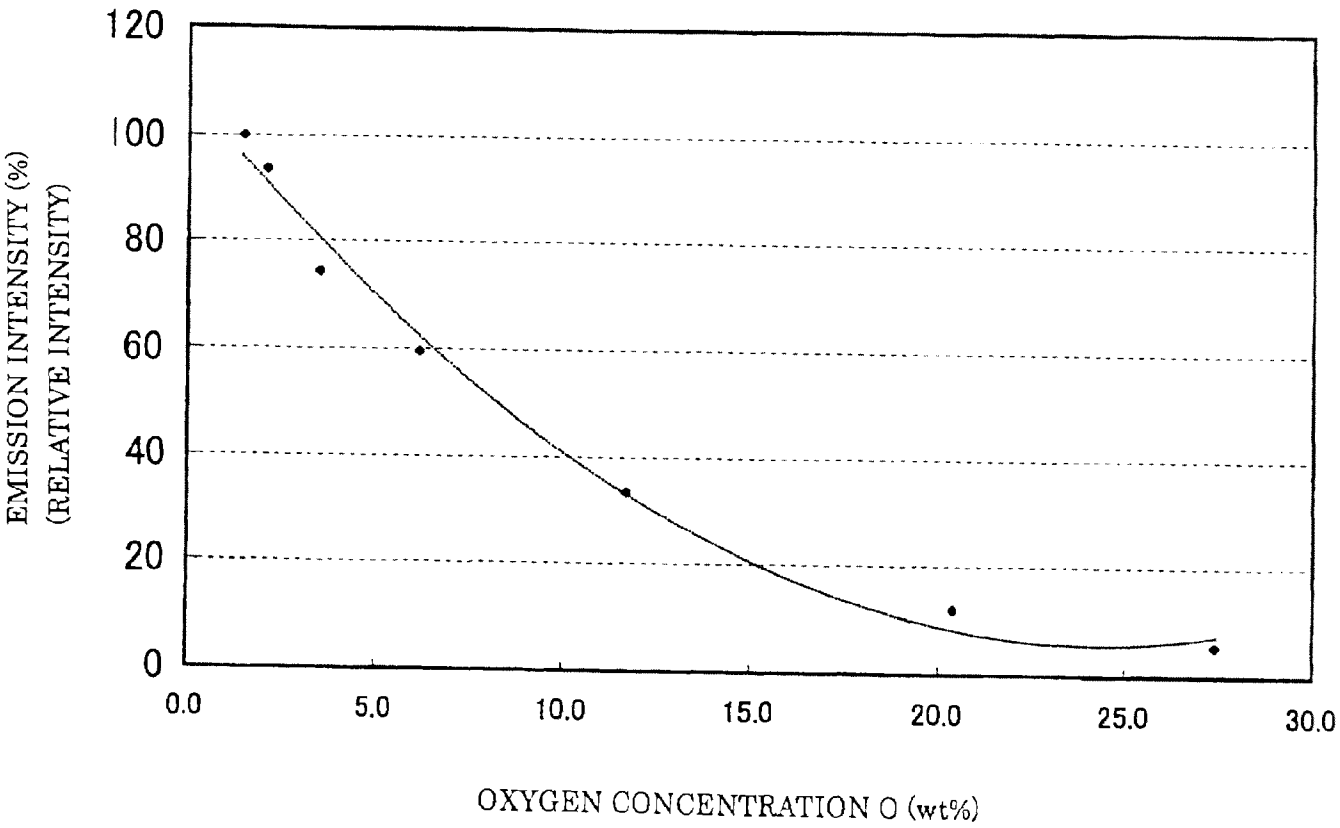
FIG. 7 is a graph showing the change in the emission intensity when oxygen concentration is changed.

The aforementioned measured result will be explained with reference to Table 6 and FIG. 7. Here, FIG. 7 is a graph showing the relative emission intensity of the phosphor sample in the ordinate, and the value of oxygen concentration in the phosphor in the abscissa. Note that in the emission intensity and the luminance, the value before substituting the $SiO_2$ for the $Si_3N_4$(3N) is defined as 100%, and the light having an emission spectrum with a peak at 460 nm is used as an excitation light.

As clearly shown in the result of Table 6 and FIG. 7, in association with the increased oxygen concentration, the emission intensity and the luminance are reduced, and significantly reduced when the oxygen concentration is 5.0 wt % or more.

The reason is considered to be that when the oxygen concentration reaches more than 5.0 wt %, the matrix structure of the phosphor is formed into glass, and the crystal structure is collapsed, thereby reducing crystalinity. Actually, when the sample different in oxygen concentration was subjected to x-ray diffraction, it was confirmed that as the oxygen concentration was increased, the peak strength of diffraction was significantly reduced, and further the half-value width of the peak was gradually made larger, that means that the matrix structure is formed into glass, in association with the elevated oxygen concentration. When the matrix structure of the phosphor was formed into glass, the structure around $Eu^{2+}$ serving as an emission center is formed irregular. Therefore, it seems that although light can be emitted with efficiency in some part, the light is absolutely not emitted in another part. Accordingly, when the oxygen concentration capable of maintaining the crystalinity of the phosphor is set to be 5.0 wt % or less, it seems that sufficient emission intensity and luminance can be obtained.

TABLE 6

| Composition formula | $SiO_2$ Substitution (%) | O (wt %) | N (wt %) | Emission intensity | Luminance | Peak wavelength | Chromaticity x | Chromaticity y |
|---|---|---|---|---|---|---|---|---|
| $Ca_{1.005}Al_{2.5}Si_5O_{0.083}N_{9.782}$: $Eu_{0.055}$ | 0.0 | 1.47 | 34.80 | 100.0% | 100.0% | 599.8 nm | 0.557 | 0.440 |
| $Ca_{1.005}Al_{2.5}Si_5O_{0.583}N_{9.448}$: $Eu_{0.055}$ | 5.0 | 2.07 | 34.50 | 83.6% | 95.6% | 597.0 nm | 0.553 | 0.444 |
| $Ca_{1.005}Al_{2.5}Si_5O_{1.083}N_{9.115}$: $Eu_{0.055}$ | 10.0 | 3.49 | 35.50 | 74.2% | 78.8% | 594.5 nm | 0.545 | 0.452 |
| $Ca_{1.005}Al_{2.5}Si_5O_{2.583}N_{9.115}$: $Eu_{0.055}$ | 25.0 | 6.18 | 28.90 | 59.5% | 58.5% | 590.4 nm | 0.528 | 0.487 |
| $Ca_{1.005}Al_{2.5}Si_5O_{5.083}N_{6.448}$: $Eu_{0.055}$ | 50.0 | 11.70 | 24.20 | 33.4% | 42.9% | 582.1 nm | 0.503 | 0.488 |
| $Ca_{1.005}Al_{2.5}Si_5O_{7.583}N_{4.782}$: $Eu_{0.055}$ | 75.0 | 20.40 | 19.30 | 12.0% | 17.2% | 575.8 nm | 0.480 | 0.501 |
| $Ca_{1.005}Al_{2.5}Si_5O_{10.08}N_{3.118}$: $Eu_{0.055}$ | 100.0 | 27.40 | 12.70 | 5.7% | 9.4% | 571.0 nm | 0.448 | 0.511 |

Embodiment 6

Figure 8:
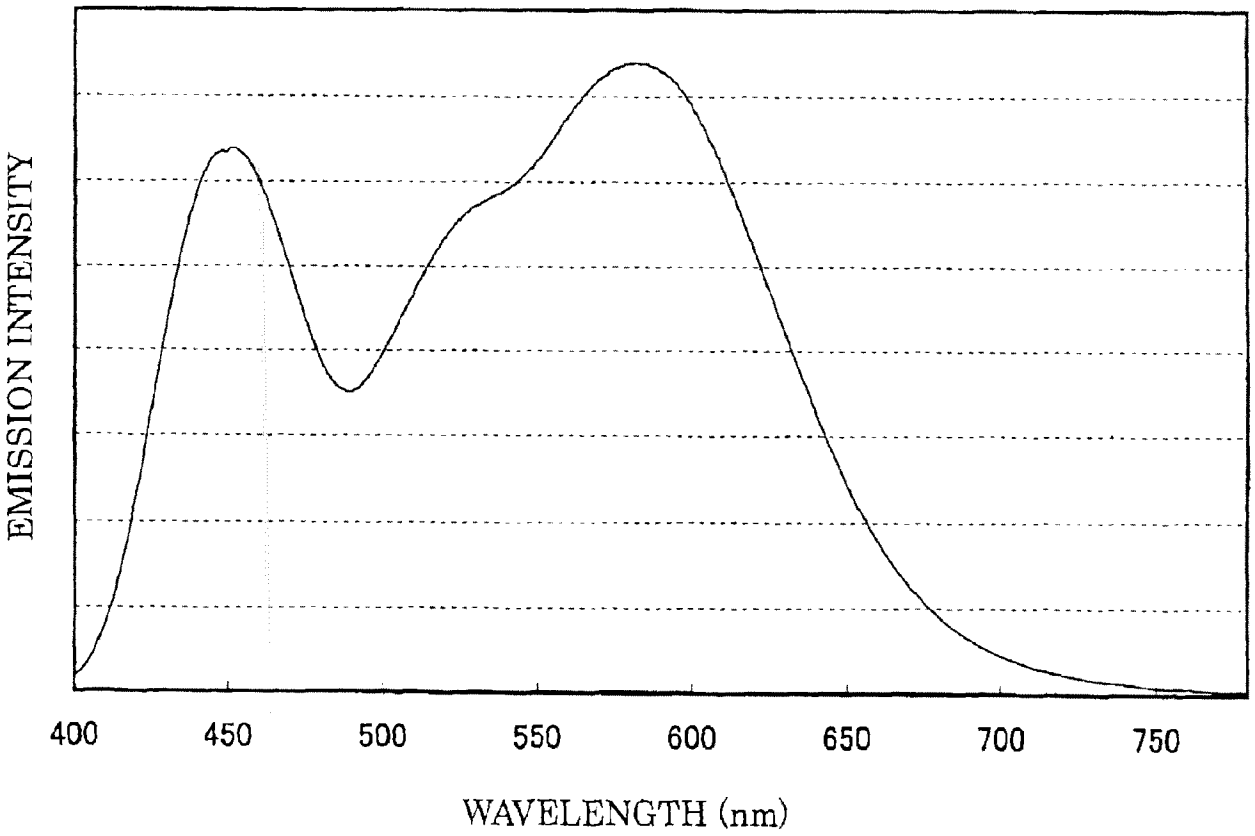
FIG. 8 is a graph showing an emission spectrum of the white LED according to the embodiment.

The LED (emission wavelength of 385.2 nm) of ultraviolet light having a nitride semiconductor is set an the light waiting part, and on the LED, the phosphor mixture of three kinds of phosphors was placed such as phosphor sample obtained by the embodiment 1, the commercially available blue phosphor BAM:Eu, and commercially available green phosphor ZnS; Cu, Al. Such three kinds of phosphors were mixed at a prescribed mixing ratio capable of obtaining a day-light color corresponding to color temperature of 5000K, calculated by the publicly-known method, and the white LED was manufactured by combining the phosphor thus obtained and the light emitting part by the publicly-known method. The emission spectrum of the white LED thus obtained was measured and the result is shown in FIG. 8. Each phosphor emitted light by the ultraviolet light emitted from the light emitting part, and the white LSD emitting white light corresponding to the color temperature of 4991K could be obtained. The general color rendering index value (Ra) of the white LED thus obtained was 80. Further, by properly changing the blending amount of the phosphors, the emission color of various color tones excellent in color rendering properties could be obtained.

What is claimed is:

[1. A phosphor which is given as a general composition formula expressed by MmAaBbOoNn:Z, (where element M is the element having bivalent valency, element A is the element having tervalent valency, element B is the element having tetravalent valency, O is oxygen, N is nitrogen, and element Z is the element acting as the activator), expressed by m=1, a+b<8, 0<o≤1.0, n=2/3m+a+4/3b−2/3o.]

[2. A phosphor which is given as a general composition formula expressed by MmAaBbOoNn: Z, (where element M is the element having bivalent valency, element A is the element having tervalent valency, element B is the element having tetravalent valency, O is oxygen, N is nitrogen, and element Z is the element acting as the activator), expressed by m=1, 1.8≤a/m≤5.0, a+b<8, o≤1.0, n=2/3m+a+4/3b−2/3o.]

3. A phosphor which is given as a general composition formula expressed by MmAaBbOoNn:Z (where element M is the element having bivalent valency, element A is the element having tervalent valency, element B is the element having tetravalent valency, O is oxygen, N is nitrogen, and element Z is the element acting as the activator), expressed by [m-1] *m=1*, [1.8≤a/m≤5.0, 3.0≤b/m≤6.2,] *a=2, 4.0≤b/m≤5.5,* a+b<8, o≤1.0, n=2/3m+a+4/3b−2/3o*, and*

*which has an emission peak wavelength from 570 nm to 620 nm.*

[4. The phosphor according to claim 1, which is given as the composition formula expressed by a=2, 4.0≤b/m≤5.5.]

5. The phosphor according to claim [4] *3*, which is given as the composition formula expressed by b/m=4.0.

6. The phosphor according to claim [1] *3*, wherein the element M is one or more kind of element selected from a group consisting of Mg, Ca, Sr, Ba, Zn, and rare earth elements having bivalent valency, element A is one or more kind of element selected from a group consisting of B (boron), Al, Ga, In, Tl, Y, Sc, P, As, Sb, and Bi, element B is one or more kind of element selected from the group consisting of C, Si, Ge, Sn, Ti, Hf, Mo, W, Cr, Pb, Zr, and element Z is one or more kind of element selected from the group consisting of the rare earth elements and transition metal elements.

7. The phosphor according to claim [1] *3*, wherein the element A is Al and the element B is Si.

8. The phosphor according to claim [1] *3*, wherein the element M is one or more kind of element selected from the group consisting of Mg, Ca, Sr, Ba, and Zn.

9. The phosphor according to claim [1] *3*, wherein the element Z is one or more kind of element selected from the group consisting of Eu, Mn, Ce, and Tb.

10. The phosphor according to claim [1] *3*, wherein the element Z is Eu.

11. The phosphor according to claim [1] *3*, wherein the element M is Ca, the element A is Al, and the element B is Si.

12. The phosphor according to claim [1] *3*, wherein when the general formula is expressed by MmAaBbOoNn:Zz, the value of z/(m+z), which is a molar ratio of the element M to the element Z, is not less than 0.0001 and not more than 0.5.

13. The phosphor according to claim [1] *3*, containing 8.4 to 13.5 wt % of Ca, 11.7 to 17.9 wt % of Al, 29.8 to 41.7 wt % of Si, 0 to 5.0 wt % of O, 30.5 to 37.0 wt % of N, and 0.01 to 5.0 wt % of Eu, wherein a peak wavelength in an emission spectrum is in a wavelength range from 570 to 620 nm, with chromaticity x of the emission in the range from 0.5 to 0.6, and y in the range from 0.4 to 0.5.

14. The phosphor according to claim [1] *3*, wherein the phosphor is formed in hexagonal crystals.

15. The phosphor according to claim [1] *3*, wherein the phosphor is a powdery form.

16. The phosphor according to claim 15, wherein as average size of the phosphor is not less than 20 μm, and not more than 1.0 μm.

17. A method of manufacturing a phosphor according to claim [1] *3*, wherein by using nitride of each element as a supply source of the element M, the element A, and the element B, the raw material is fired at 1000° C. or more in an atmosphere of inactive gas.

18. A light source, comprising the phosphor according to claim [1] *3*, and a light emitting part for emitting light of a first wavelength, wherein by using a part or the whole part of the light of the first wavelength as an excitation light, the phosphor is caused to emit light with a wavelength different from the first wavelength.

19. The light source according to claim 18, wherein the first wavelength is the wavelength form 250 nm to 550 nm.

20. The light source according to claim 18, wherein the light emitting part for emitting the light of the first wavelength is an LED.

*21. A phosphor which is given as a general composition formula expressed by MmAaBbOoNn:Z where element M is the element having bivalent valency, element A is the element having tervalent valency, element B is the element having tetravalent valency, O is oxygen, N is nitrogen, and element Z is the element acting as the activator, expressed by m=1, 1.8≤a/m≤5.0, 3.0≤b/m≤6.2, a+b<8, o≤1.0, n=2/3m+a+4/3b-2/3o, and*

*which has an emission peak wavelength from 570 nm to 620 nm,*

*wherein when the general formula is expressed by MmAaBbOoNn:Zz, the value of z/(m+z), which is a molar ratio of the element M to the element Z, is not less than 0.0001 and not more than 0.5.*

*22. A method of manufacturing a phosphor which is given as a general composition formula expressed by MmAaBbOoNn:Z where element M is the element having bivalent valency, element A is the element having tervalent valency, element B is the element having tetravalent valency, O is oxygen, N is nitrogen, and element Z is the element acting as the activator, expressed by m=1, 1.8≤a/m≤5.0, 3.0≤b/m≤6.2, a+b<8, o≤1.0, n=2/3m+a+4/3b-2/3o, wherein by using nitride of each element as a supply source of the element M, the element A, and the element B, raw material is fired at 1000° C. or more in an atmosphere of inactive gas.*

* * * * *